US012574177B2

(12) United States Patent
Chun et al.

(10) Patent No.: US 12,574,177 B2
(45) Date of Patent: Mar. 10, 2026

(54) TRIGGER FRAME

(71) Applicant: LG ELECTRONICS INC., Seoul (KR)

(72) Inventors: Jinyoung Chun, Seoul (KR); Jinsoo Choi, Seoul (KR); Dongguk Lim, Seoul (KR); Eunsung Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 368 days.

(21) Appl. No.: 18/034,508

(22) PCT Filed: Nov. 17, 2021

(86) PCT No.: PCT/KR2021/016864
§ 371 (c)(1),
(2) Date: Apr. 28, 2023

(87) PCT Pub. No.: WO2022/108327
PCT Pub. Date: May 27, 2022

(65) Prior Publication Data
US 2023/0379109 A1 Nov. 23, 2023

(30) Foreign Application Priority Data

Nov. 18, 2020 (KR) ........................ 10-2020-0154776
Nov. 23, 2020 (KR) ........................ 10-2020-0158108

(51) Int. Cl.
*H04L 5/00* (2006.01)
*H04L 27/26* (2006.01)
*H04W 72/0453* (2023.01)

(52) U.S. Cl.
CPC .......... *H04L 5/0048* (2013.01); *H04L 5/0094* (2013.01); *H04L 27/2602* (2013.01); *H04W 72/0453* (2013.01)

(58) Field of Classification Search
CPC ... H04L 5/0007; H04L 5/0053; H04L 5/0048; H04L 5/0092; H04L 5/0094;
(Continued)

(56) References Cited

U.S. PATENT DOCUMENTS

| 11,115,163 B2 * | 9/2021 | Noh ...................... H04L 5/0023 |
| 12,120,065 B2 * | 10/2024 | Park ...................... H04L 1/0068 |

(Continued)

FOREIGN PATENT DOCUMENTS

WO          2017030342          2/2017

OTHER PUBLICATIONS

Samsung, "RU Allocation Subfield Design for EHT Trigger Frame Follow up," IEEE 802.11-20/1845r2, Nov. 16, 2020.
(Continued)

*Primary Examiner* — Brian T O Connor
(74) *Attorney, Agent, or Firm* — BRYAN CAVE LEIGHTON PAISNER LLP

(57) ABSTRACT

The present specification proposes an improved trigger frame structure for triggering a plurality of STAs and a method for allocating bandwidths and RUs to the plurality of STAs on the basis of the improved trigger frame structure. Here, according to an embodiment of the present specification, the plurality of STAs may be STAs supporting different standards. Also, according to another embodiment of the present specification, TB PPDUs transmitted by the plurality of STAs on the basis of the improved trigger frame structure may be A-PPDUs.

10 Claims, 19 Drawing Sheets

(58) Field of Classification Search
CPC ............ H04L 27/2602; H04W 28/065; H04W
72/0453; H04W 74/0808; H04W 72/23;
H04W 84/12; H04W 72/0457
See application file for complete search history.

(56) References Cited

U.S. PATENT DOCUMENTS

| | | | |
|---|---|---|---|
| 12,207,134 B2 * | 1/2025 | Chun | H04L 5/0048 |
| 12,231,363 B2 * | 2/2025 | Liu | H04L 27/262 |
| 2021/0194630 A1 * | 6/2021 | Liu | H04L 5/0005 |
| 2021/0227510 A1 * | 7/2021 | Hu | H04L 1/0071 |
| 2022/0014406 A1 * | 1/2022 | Anwyl | H04L 27/2621 |
| 2022/0132371 A1 * | 4/2022 | Wu | H04W 28/065 |
| 2023/0224203 A1 * | 7/2023 | Liu | H04L 27/2603 |
| | | | 370/328 |
| 2023/0232385 A1 * | 7/2023 | Huang | H04B 7/0452 |
| | | | 370/329 |
| 2024/0188140 A1 * | 6/2024 | Noh | H04W 72/04 |
| 2025/0142573 A1 * | 5/2025 | Huang | H04W 72/20 |

OTHER PUBLICATIONS

Huawei, "Specification Framework for TGbe," IEEE 802.11-20/
1262r15, Sep. 20, 2020.
Huawei, "UL Length Indication in Trigger Frame," IEEE 802.11-
20/1685r2, Nov. 16, 2020.
Huawei, "Spatial Stream Allocation in Trigger Frames," IEEE
802.11-20/1669r2, Oct. 26, 2020.

* cited by examiner

FIG. 1
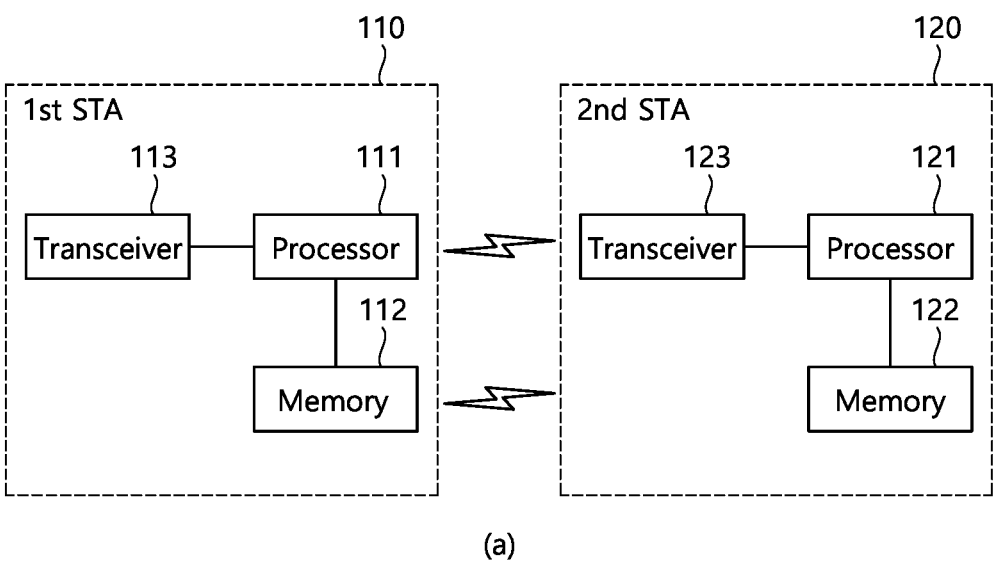
(a)
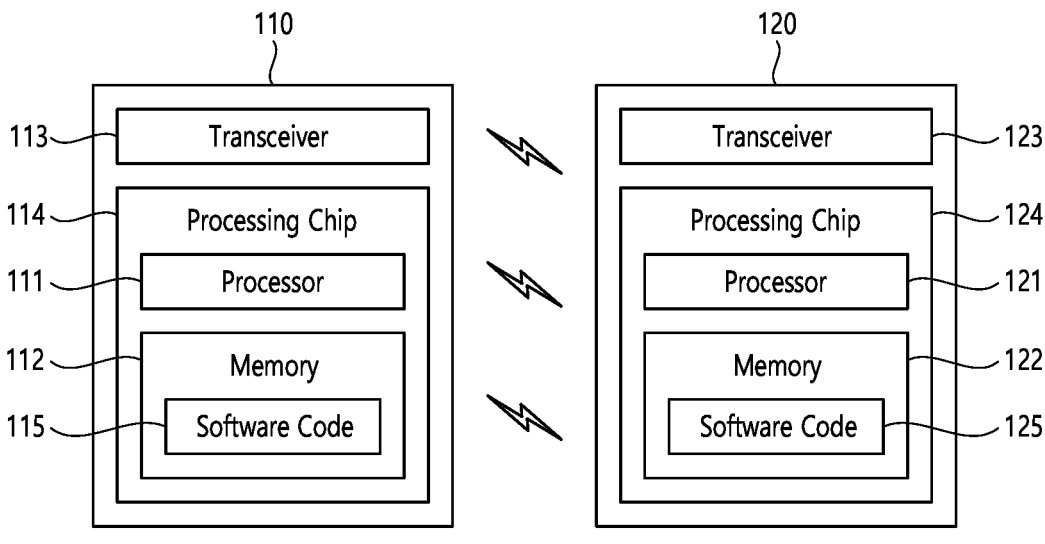
(b)

FIG. 2
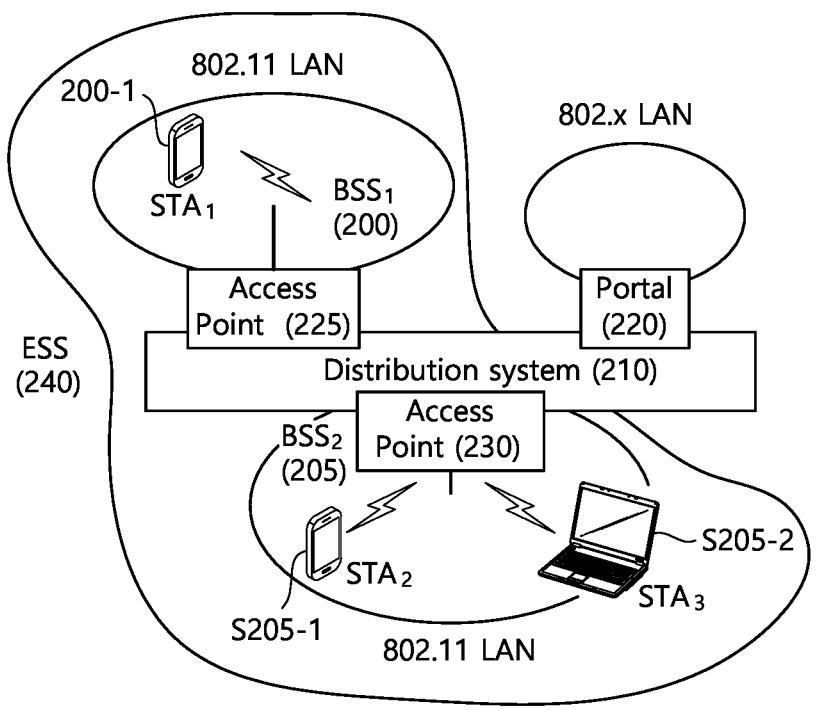
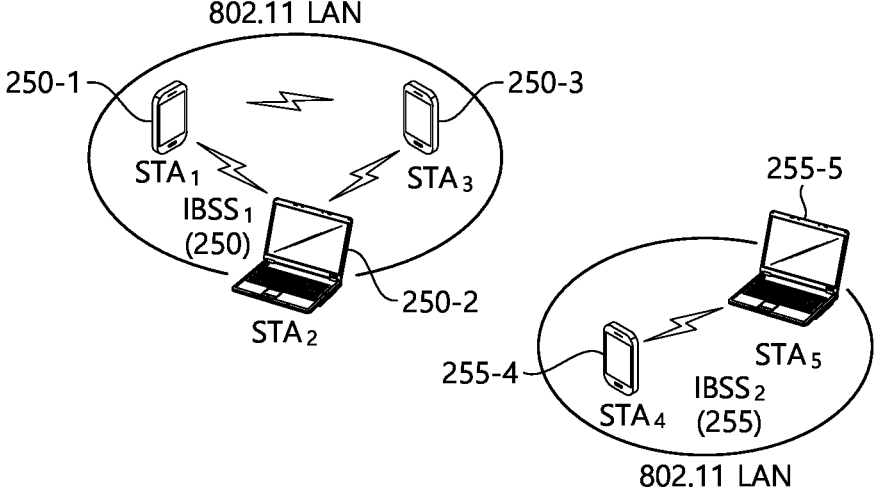

FIG. 4

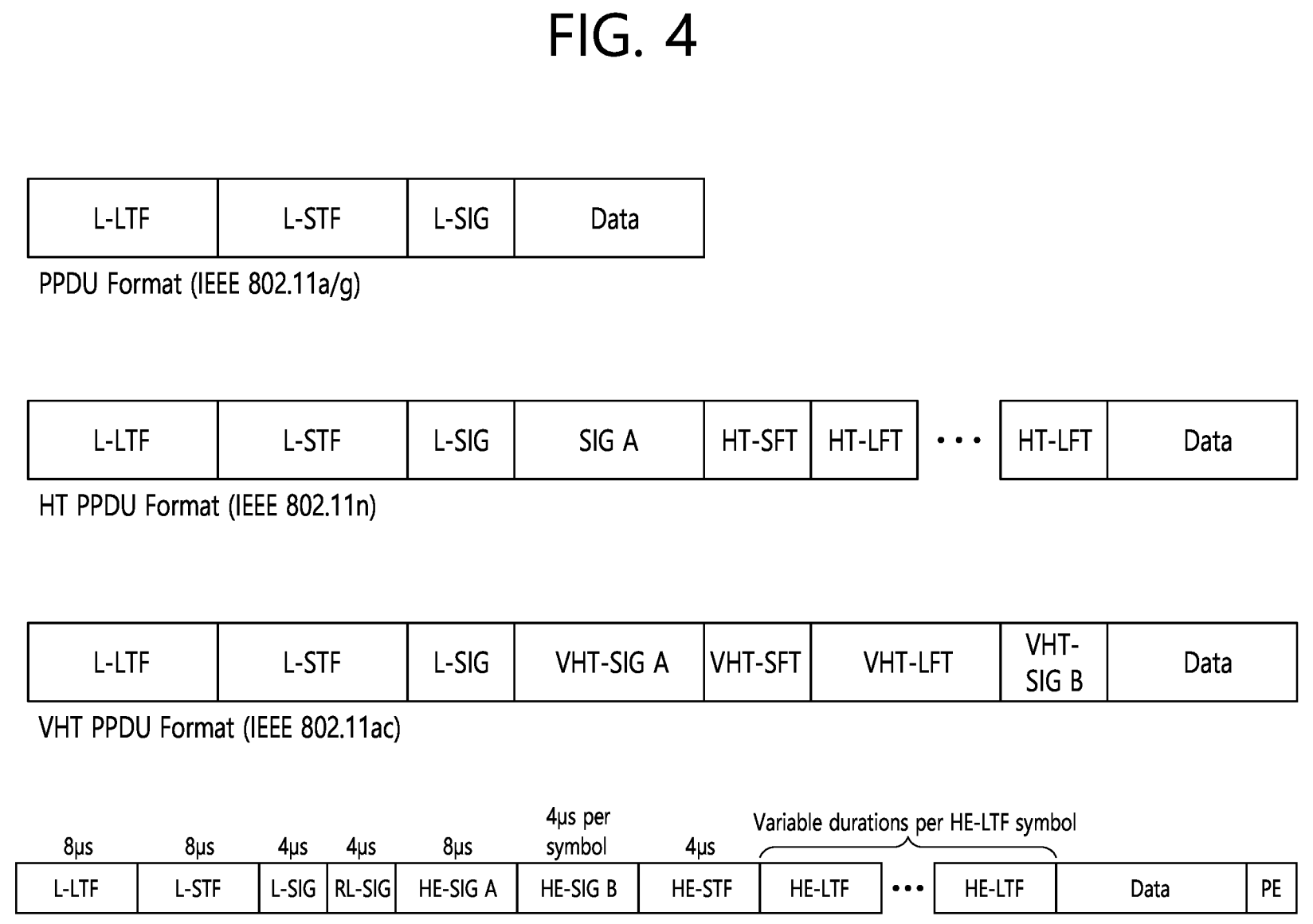

| L-LTF | L-STF | L-SIG | Data |
|-------|-------|-------|------|

PPDU Format (IEEE 802.11a/g)

| L-LTF | L-STF | L-SIG | SIG A | HT-SFT | HT-LFT | ... | HT-LFT | Data |
|-------|-------|-------|-------|--------|--------|-----|--------|------|

HT PPDU Format (IEEE 802.11n)

| L-LTF | L-STF | L-SIG | VHT-SIG A | VHT-SFT | VHT-LFT | VHT-SIG B | Data |
|-------|-------|-------|-----------|---------|---------|-----------|------|

VHT PPDU Format (IEEE 802.11ac)

8μs    8μs    4μs   4μs    8μs    4μs per symbol    4μs

| L-LTF | L-STF | L-SIG | RL-SIG | HE-SIG A | HE-SIG B | HE-STF | HE-LTF | ... | HE-LTF | Data | PE |
|-------|-------|-------|--------|----------|----------|--------|--------|-----|--------|------|-----|

Variable durations per HE-LTF symbol

FIG. 6
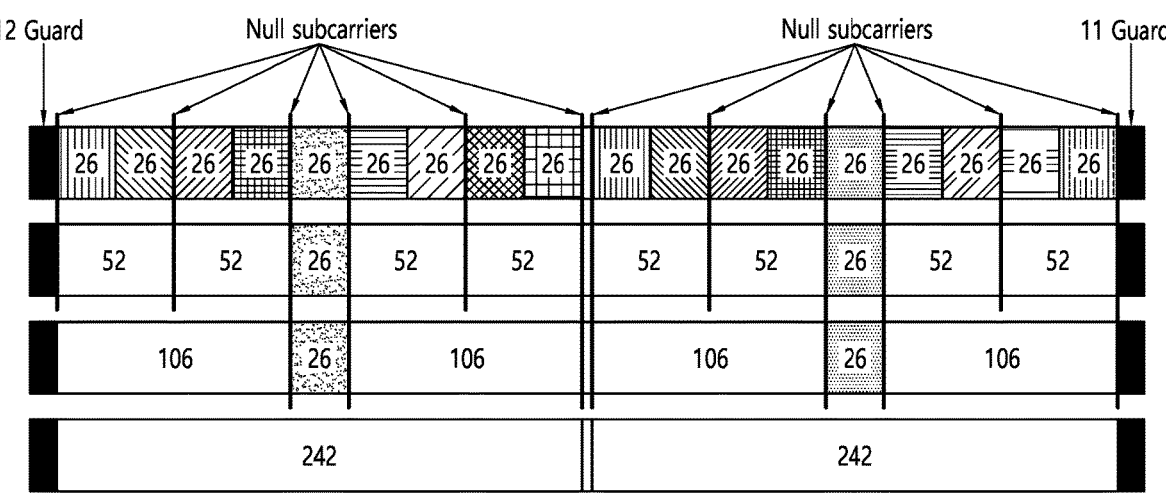
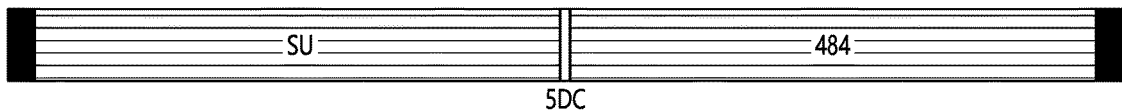

FIG. 10

| L-STF | L-LTF | L-SIG | RL-SIG | U-SIG | EHT-SIG | EHT-STF | EHT-LTF | Data |
|-------|-------|-------|--------|-------|---------|---------|---------|------|

FIG. 13

| B0 B3 | B4 B15 | B16 | B17 | B18 B19 | B20 B21 | B22 | B23 B25 |
|---|---|---|---|---|---|---|---|
| Trigger Type | UL Length | More TF | CS required | UL BW | GI and HE-LTF Type/ TXOP Sharing Mode | MU-MIMO HE-LTF Mode | Number of HE-LTF Symbols And Midamble Periodicity |
| 4 | 12 | 1 | 1 | 2 | 2 | 1 | 4 |

Bits:

| B26 | B27 | B28 B33 | B34 B35 | B36 | B37 B52 | B53 | B54 B62 |
|---|---|---|---|---|---|---|---|
| UL STBC | LDPC Extra Symbol Segment | AP Tx Power | Pre-FEC Padding Factor | PE Disambiguity | UL Spatial Reuse | Doppler | UL HE-SIG-A2 Reserved |
| 1 | 1 | 6 | 2 | 1 | 16 | 1 | 9 |

Bits:

| B63 |
|---|
| Reserved |
| 1 |

| Trigger Dependent Common Info |
|---|
| variable |

Bits:

FIG. 14

| B0  B3 | B4  B15 | B16 | B17 | B18  B19 | B20  B21 | B22 | B23  B25 |
|---|---|---|---|---|---|---|---|
| Trigger Type | UL Length | More TF | CS required | UL BW | GI and HE-LTF Type/ TXOP Sharing Mode | MU-MIMO HE-LTF Mode | Number of EHT-LTF Symbols And Midamble Periodicity |

Bits:  | 4 | 12 | 1 | 1 | 2 | 2 | 1 | 3 |

| B26 | B27 | B28  B33 | B34  B35 | B36 | B37  B52 | B53 | B54  B62 |
|---|---|---|---|---|---|---|---|
| UL STBC | LDPC Extra Symbol Segment | AP Tx Power | Pre-FEC Padding Factor | PE Disambiguity | UL Spatial Reuse | Doppler | HE/EHT P160 |

Bits:  | 1 | 1 | 6 | 2 | 1 | 16 | 1 | 1 |

| B55 | B56  B62 | B63 | |
|---|---|---|---|
| Special User Info Field Present | Reserved | Reserved | Trigger Dependent Common Info |

Bits:  | 1 | 7 | 1 | variable |

FIG. 15

| B0 B3 | B4 B7 | B8 B11 | B12 B15 |
|---|---|---|---|
| Spatial Reuse 1 | Spatial Reuse 2 | Spatial Reuse 3 | Spatial Reuse 4 |

Bits:  4  4  4  4

FIG. 16

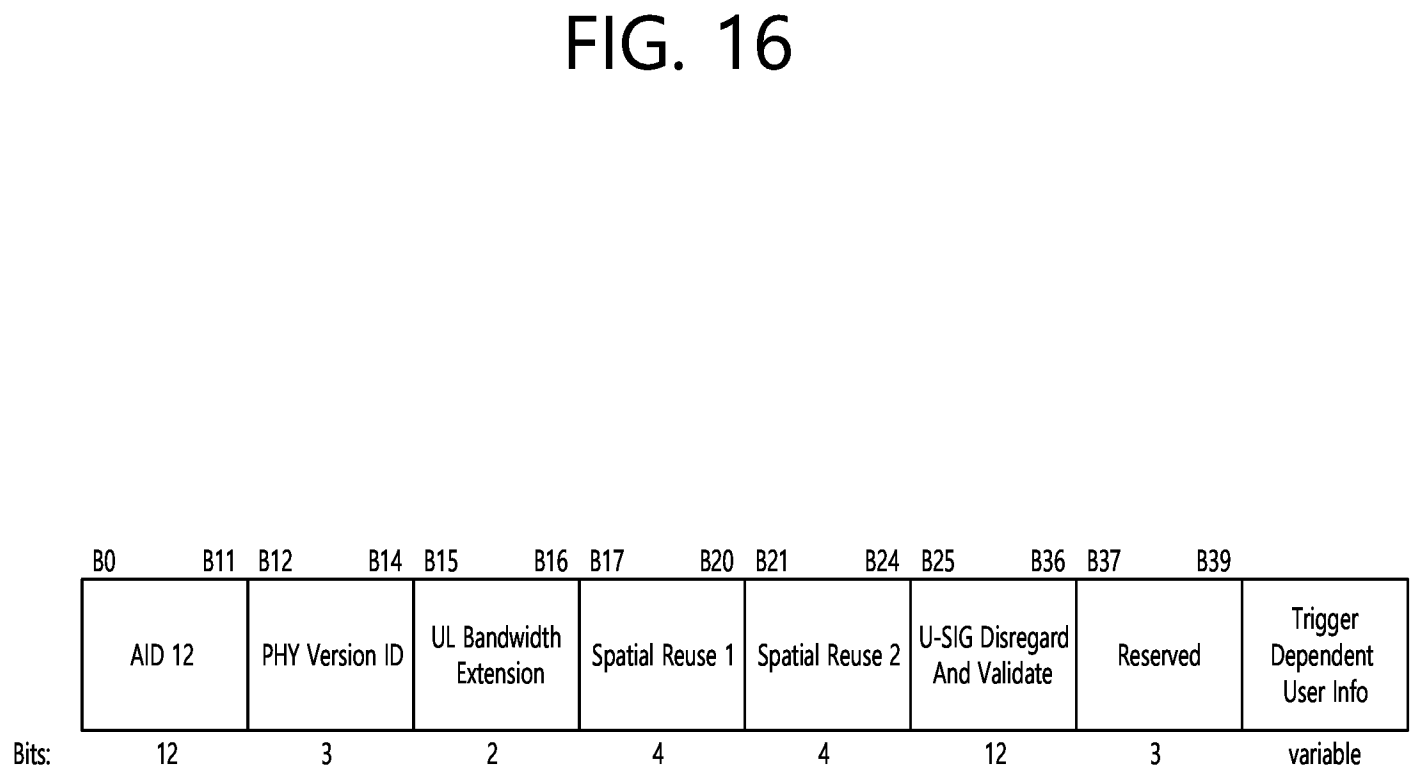

| AID 12 | PHY Version ID | UL Bandwidth Extension | Spatial Reuse 1 | Spatial Reuse 2 | U-SIG Disregard And Validate | Reserved | Trigger Dependent User Info |
|---|---|---|---|---|---|---|---|
| 12 | 3 | 2 | 4 | 4 | 12 | 3 | variable |

Bits:

TRIGGER FRAME

CROSS-REFERENCE TO RELATED APPLICATIONS

This application is the National Stage filing under 35 U.S.C. 371 of International Application No. PCT/KR2021/016864, filed on Nov. 17, 2021, which claims the benefit of Korean Patent Application No. 10-2020-0154776 filed on Nov. 18, 2020, and Korean Patent Application No. 10-2020-0158108 filed on Nov. 23, 2020, which are all hereby incorporated by reference herein in their entirety.

TECHNICAL FIELD

The present disclosure is related to a wireless communication.

BACKGROUND

A wireless local area network (WLAN) has been improved in various ways. For example, the IEEE 802.11ax standard proposed an improved communication environment using orthogonal frequency division multiple access (OFDMA) and downlink multi-user multiple input multiple output (DL MU MIMO) techniques.

The introduction of an aggregated-PPDU (A-PPDU) in the next generation wireless LAN system is discussed. The A-PPDU may be a PPDU in which a plurality of PPDUs are aggregated. The plurality of PPDUs may be transmitted by different STAs or by one STA. At this time, a trigger frame structure for triggering a TB A-PPDU transmitted by a plurality of receiving STAs and a bandwidth and RU allocation method for the plurality of receiving STAs are required. In particular, when the plurality of receiving STAs support different standards, a more efficient triggering method for the plurality of receiving STAs is required.

SUMMARY

The present specification proposes an improved trigger frame structure and a method for triggering transmission of a TB A-PPDU based on the improved trigger frame structure.

According to the present specification, a trigger frame structure capable of simultaneously triggering a plurality of STAs and a TB PPDU triggering method based on the structure are proposed. Thus, signaling efficiency can be increased. In particular, when the TB PPDU is an A-PPDU transmitted through the same time domain resource and/or when the plurality of STAs are STAs supporting different standards, signaling efficiency can be further increased through the method proposed in the present specification.

BRIEF DESCRIPTION OF THE DRAWINGS

FIG. 1 shows an example of a transmitting apparatus and/or receiving apparatus of the present specification.

FIG. 2 is a conceptual view illustrating the structure of a wireless local area network (WLAN).

FIG. 4 illustrates an example of a PPDU used in an IEEE standard.

FIG. 6 illustrates a layout of RUs used in a band of 40 MHz.

FIG. 10 illustrates an example of a PPDU used in the present specification.

FIG. 13 shows an example of a common information field of a trigger frame.

FIG. 14 shows another example of a common information field of a trigger frame.

FIG. 15 shows a format of a UL Spatial Reuse subfield.

FIG. 16 shows an example of a format of a Special User Info field.

DETAILED DESCRIPTION

Figure 3:
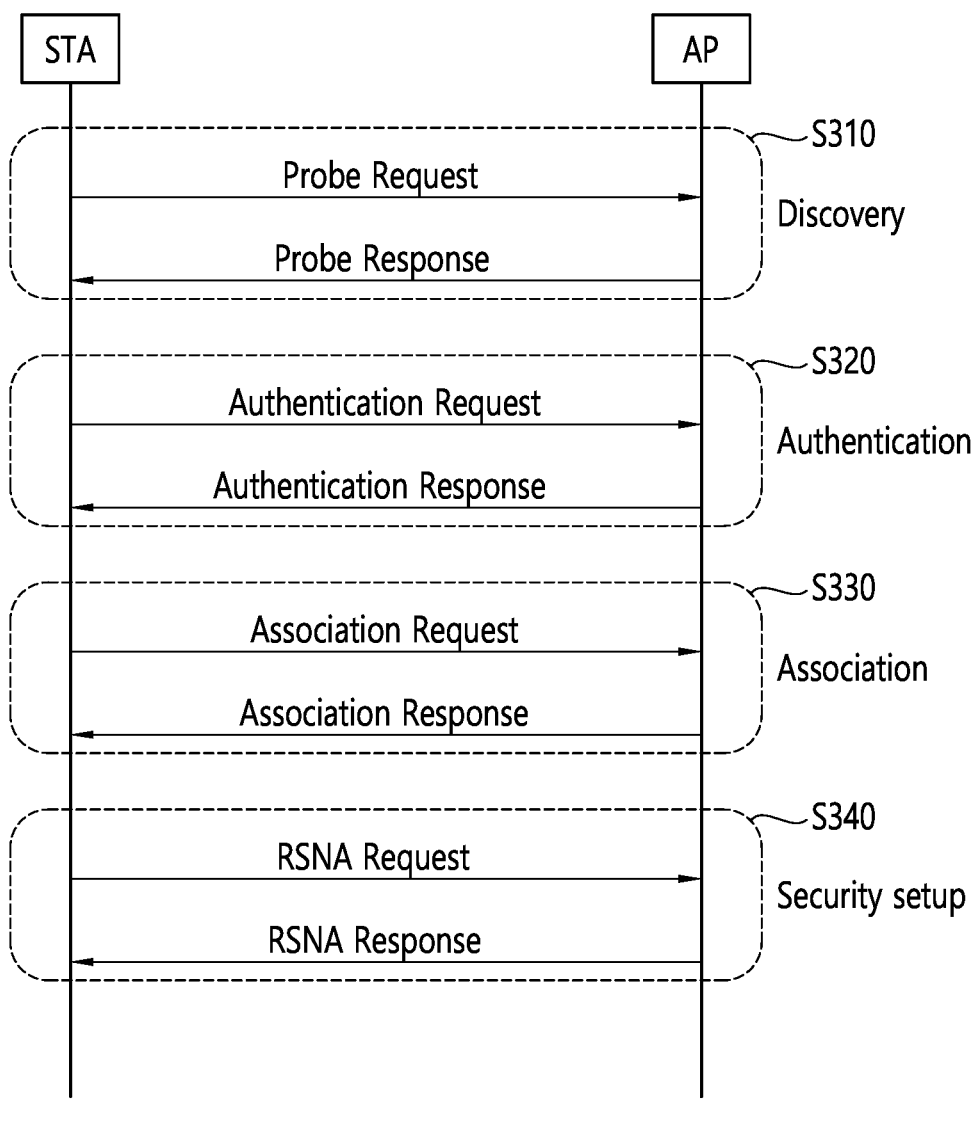
FIG. 3 illustrates a general link setup process.

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (EHT-signal)", it may mean that "EHT-signal" is proposed as an example of the "control information". In other words, the "control information" of the present specification is not limited to "EHT-signal", and "EHT-signal" may be proposed as an example of the "control information". In addition, when indicated as "control information (i.e., EHT-signal)", it may also mean that "EHT-signal" is proposed as an example of the "control information".

Technical features described individually in one figure in the present specification may be individually implemented, or may be simultaneously implemented.

The following example of the present specification may be applied to various wireless communication systems. For example, the following example of the present specification may be applied to a wireless local area network (WLAN) system. For example, the present specification may be applied to the IEEE 802.11a/g/n/ac standard or the IEEE 802.11ax standard. In addition, the present specification may also be applied to the newly proposed EHT standard or IEEE 802.11be standard. In addition, the example of the present specification may also be applied to a new WLAN standard enhanced from the EHT standard or the IEEE 802.11be standard. In addition, the example of the present specification may be applied to a mobile communication system. For example, it may be applied to a mobile communication system based on long term evolution (LTE) depending on a 3rd generation partnership project (3GPP) standard and based on evolution of the LTE. In addition, the example of the present specification may be applied to a communication system of a 5G NR standard based on the 3GPP standard.

Hereinafter, in order to describe a technical feature of the present specification, a technical feature applicable to the present specification will be described.

FIG. 1 shows an example of a transmitting apparatus and/or receiving apparatus of the present specification.

In the example of FIG. 1, various technical features described below may be performed. FIG. 1 relates to at least one station (STA). For example, STAs 110 and 120 of the present specification may also be called in various terms such as a mobile terminal, a wireless device, a wireless transmit/receive unit (WTRU), a user equipment (UE), a mobile station (MS), a mobile subscriber unit, or simply a user. The STAs 110 and 120 of the present specification may also be called in various terms such as a network, a base station, a node-B, an access point (AP), a repeater, a router, a relay, or the like. The STAs 110 and 120 of the present specification may also be referred to as various names such as a receiving apparatus, a transmitting apparatus, a receiving STA, a transmitting STA, a receiving device, a transmitting device, or the like.

For example, the STAs 110 and 120 may serve as an AP or a non-AP. That is, the STAs 110 and 120 of the present specification may serve as the AP and/or the non-AP. In the present specification, the AP may be indicated as an AP STA.

The STAs 110 and 120 of the present specification may support various communication standards together in addition to the IEEE 802.11 standard. For example, a communication standard (e.g., LTE, LTE-A, 5G NR standard) or the like based on the 3GPP standard may be supported. In addition, the STA of the present specification may be implemented as various devices such as a mobile phone, a vehicle, a personal computer, or the like. In addition, the STA of the present specification may support communication for various communication services such as voice calls, video calls, data communication, and self-driving (autonomous-driving), or the like.

The STAs 110 and 120 of the present specification may include a medium access control (MAC) conforming to the IEEE 802.11 standard and a physical layer interface for a radio medium.

The STAs 110 and 120 will be described below with reference to a sub-figure (a) of FIG. 1.

The first STA 110 may include a processor 111, a memory 112, and a transceiver 113. The illustrated process, memory, and transceiver may be implemented individually as separate chips, or at least two blocks/functions may be implemented through a single chip.

The transceiver 113 of the first STA performs a signal transmission/reception operation. Specifically, an IEEE 802.11 packet (e.g., IEEE 802.11a/b/g/n/ac/ax/be, etc.) may be transmitted/received.

For example, the first STA 110 may perform an operation intended by an AP. For example, the processor 111 of the AP may receive a signal through the transceiver 113, process a reception (RX) signal, generate a transmission (TX) signal, and provide control for signal transmission. The memory 112 of the AP may store a signal (e.g., RX signal) received through the transceiver 113, and may store a signal (e.g., TX signal) to be transmitted through the transceiver.

For example, the second STA 120 may perform an operation intended by a non-AP STA. For example, a transceiver 123 of a non-AP performs a signal transmission/reception operation. Specifically, an IEEE 802.11 packet (e.g., IEEE 802.11a/b/g/n/ac/ax/be packet, etc.) may be transmitted/received.

For example, a processor 121 of the non-AP STA may receive a signal through the transceiver 123, process an RX signal, generate a TX signal, and provide control for signal transmission. A memory 122 of the non-AP STA may store a signal (e.g., RX signal) received through the transceiver 123, and may store a signal (e.g., TX signal) to be transmitted through the transceiver.

For example, an operation of a device indicated as an AP in the specification described below may be performed in the first STA 110 or the second STA 120. For example, if the first STA 110 is the AP, the operation of the device indicated as the AP may be controlled by the processor 111 of the first STA 110, and a related signal may be transmitted or received through the transceiver 113 controlled by the processor 111 of the first STA 110. In addition, control information related to the operation of the AP or a TX/RX signal of the AP may be stored in the memory 112 of the first STA 110. In addition, if the second STA 120 is the AP, the operation of the device indicated as the AP may be controlled by the processor 121 of the second STA 120, and a related signal may be transmitted or received through the transceiver 123 controlled by the processor 121 of the second STA 120. In addition, control information related to the operation of the AP or a TX/RX signal of the AP may be stored in the memory 122 of the second STA 120.

For example, in the specification described below, an operation of a device indicated as a non-AP (or user-STA) may be performed in the first STA 110 or the second STA 120. For example, if the second STA 120 is the non-AP, the operation of the device indicated as the non-AP may be controlled by the processor 121 of the second STA 120, and a related signal may be transmitted or received through the transceiver 123 controlled by the processor 121 of the second STA 120. In addition, control information related to the operation of the non-AP or a TX/RX signal of the non-AP may be stored in the memory 122 of the second STA 120. For example, if the first STA 110 is the non-AP, the operation of the device indicated as the non-AP may be controlled by the processor 111 of the first STA 110, and a related signal may be transmitted or received through the transceiver 113 controlled by the processor 111 of the first STA 110. In addition, control information related to the operation of the non-AP or a TX/RX signal of the non-AP may be stored in the memory 112 of the first STA 110.

In the specification described below, a device called a (transmitting/receiving) STA, a first STA, a second STA, an STA1, an STA2, an AP, a first AP, a second AP, an AP1, an AP2, a (transmitting/receiving) terminal, a (transmitting/receiving) device, a (transmitting/receiving) apparatus, a network, or the like may imply the STAs 110 and 120 of FIG. 1. For example, a device indicated as, without a specific reference numeral, the (transmitting/receiving) STA, the first STA, the second STA, the STA1, the STA2, the AP, the first AP, the second AP, the AP1, the AP2, the (transmitting/receiving) terminal, the (transmitting/receiving) device, the (transmitting/receiving) apparatus, the network, or the like may imply the STAs 110 and 120 of FIG. 1. For example, in the following example, an operation in which various STAs transmit/receive a signal (e.g., a PPDU) may be performed in the transceivers 113 and 123 of FIG. 1. In addition, in the following example, an operation in which various STAs generate a TX/RX signal or perform data processing and computation in advance for the TX/RX signal may be performed in the processors 111 and 121 of FIG. 1. For example, an example of an operation for generating the TX/RX signal or performing the data processing and computation in advance may include: 1) an operation of determining/obtaining/configuring/computing/decoding/encoding bit information of a sub-field (SIG, STF, LTF, Data) included in a PPDU; 2) an operation of determining/configuring/obtaining a time resource or frequency resource (e.g., a subcarrier resource) or the like used for the sub-field (SIG, STF, LTF, Data) included the PPDU; 3) an operation of determining/configuring/obtaining a specific sequence (e.g., a pilot sequence, an STF/LTF sequence, an extra sequence applied to SIG) or the like used for the sub-field (SIG, STF, LTF, Data) field included in the PPDU; 4) a power control operation and/or power saving operation applied for the STA; and 5) an operation related to determining/obtaining/configuring/decoding/encoding or the like of an ACK signal. In addition, in the following example, a variety of information used by various STAs for determining/obtaining/configuring/computing/decoding/decoding a TX/RX signal (e.g., information related to a field/subfield/control field/parameter/power or the like) may be stored in the memories 112 and 122 of FIG. 1.

The aforementioned device/STA of the sub-figure (a) of FIG. 1 may be modified as shown in the sub-figure (b) of FIG. 1. Hereinafter, the STAs 110 and 120 of the present specification will be described based on the sub-figure (b) of FIG. 1.

For example, the transceivers 113 and 123 illustrated in the sub-figure (b) of FIG. 1 may perform the same function as the aforementioned transceiver illustrated in the sub-figure (a) of FIG. 1. For example, processing chips 114 and 124 illustrated in the sub-figure (b) of FIG. 1 may include the processors 111 and 121 and the memories 112 and 122. The processors 111 and 121 and memories 112 and 122 illustrated in the sub-figure (b) of FIG. 1 may perform the same function as the aforementioned processors 111 and 121 and memories 112 and 122 illustrated in the sub-figure (a) of FIG. 1.

A mobile terminal, a wireless device, a wireless transmit/receive unit (WTRU), a user equipment (UE), a mobile station (MS), a mobile subscriber unit, a user, a user STA, a network, a base station, a Node-B, an access point (AP), a repeater, a router, a relay, a receiving unit, a transmitting unit, a receiving STA, a transmitting STA, a receiving device, a transmitting device, a receiving apparatus, and/or a transmitting apparatus, which are described below, may imply the STAs 110 and 120 illustrated in the sub-figure (a)/(b) of FIG. 1, or may imply the processing chips 114 and 124 illustrated in the sub-figure (b) of FIG. 1. That is, a technical feature of the present specification may be performed in the STAs 110 and 120 illustrated in the sub-figure (a)/(b) of FIG. 1, or may be performed only in the processing chips 114 and 124 illustrated in the sub-figure (b) of FIG. 1. For example, a technical feature in which the transmitting STA transmits a control signal may be understood as a technical feature in which a control signal generated in the processors 111 and 121 illustrated in the sub-figure (a)/(b) of FIG. 1 is transmitted through the transceivers 113 and 123 illustrated in the sub-figure (a)/(b) of FIG. 1. Alternatively, the technical feature in which the transmitting STA transmits the control signal may be understood as a technical feature in which the control signal to be transferred to the transceivers 113 and 123 is generated in the processing chips 114 and 124 illustrated in the sub-figure (b) of FIG. 1.

For example, a technical feature in which the receiving STA receives the control signal may be understood as a technical feature in which the control signal is received by means of the transceivers 113 and 123 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (a) of FIG. 1 is obtained by the processors 111 and 121 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (b) of FIG. 1 is obtained by the processing chips 114 and 124 illustrated in the sub-figure (b) of FIG. 1.

Referring to the sub-figure (b) of FIG. 1, software codes 115 and 125 may be included in the memories 112 and 122. The software codes 115 and 126 may include instructions for controlling an operation of the processors 111 and 121. The software codes 115 and 125 may be included as various programming languages.

The processors 111 and 121 or processing chips 114 and 124 of FIG. 1 may include an application-specific integrated circuit (ASIC), other chipsets, a logic circuit and/or a data processing device. The processor may be an application processor (AP). For example, the processors 111 and 121 or processing chips 114 and 124 of FIG. 1 may include at least one of a digital signal processor (DSP), a central processing unit (CPU), a graphics processing unit (GPU), and a modulator and demodulator (modem). For example, the processors 111 and 121 or processing chips 114 and 124 of FIG. 1 may be SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or processors enhanced from these processors.

In the present specification, an uplink may imply a link for communication from a non-AP STA to an SP STA, and an uplink PPDU/packet/signal or the like may be transmitted through the uplink. In addition, in the present specification, a downlink may imply a link for communication from the AP STA to the non-AP STA, and a downlink PPDU/packet/signal or the like may be transmitted through the downlink.

FIG. 2 is a conceptual view illustrating the structure of a wireless local area network (WLAN).

An upper part of FIG. 2 illustrates the structure of an infrastructure basic service set (BSS) of institute of electrical and electronic engineers (IEEE) 802.11.

Referring the upper part of FIG. 2, the wireless LAN system may include one or more infrastructure BSSs 200 and 205 (hereinafter, referred to as BSS). The BSSs 200 and 205 as a set of an AP and an STA such as an access point (AP) 225 and a station (STA1) 200-1 which are successfully synchronized to communicate with each other are not concepts indicating a specific region. The BSS 205 may include one or more STAs 205-1 and 205-2 which may be joined to one AP 230.

The BSS may include at least one STA, APs providing a distribution service, and a distribution system (DS) 210 connecting multiple APs.

The distribution system 210 may implement an extended service set (ESS) 240 extended by connecting the multiple BSSs 200 and 205. The ESS 240 may be used as a term indicating one network configured by connecting one or more APs 225 or 230 through the distribution system 210. The AP included in one ESS 240 may have the same service set identification (SSID).

A portal 220 may serve as a bridge which connects the wireless LAN network (IEEE 802.11) and another network (e.g., 802.X).

In the BSS illustrated in the upper part of FIG. 2, a network between the APs 225 and 230 and a network between the APs 225 and 230 and the STAs 200-1, 205-1, and 205-2 may be implemented. However, the network is configured even between the STAs without the APs 225 and 230 to perform communication. A network in which the communication is performed by configuring the network even between the STAs without the APs 225 and 230 is defined as an Ad-Hoc network or an independent basic service set (IBSS).

A lower part of FIG. 2 illustrates a conceptual view illustrating the IBSS.

Referring to the lower part of FIG. 2, the IBSS is a BSS that operates in an Ad-Hoc mode. Since the IBSS does not include the access point (AP), a centralized management entity that performs a management function at the center does not exist. That is, in the IBSS, STAs 250-1, 250-2, 250-3, 255-4, and 255-5 are managed by a distributed manner. In the IBSS, all STAs 250-1, 250-2, 250-3, 255-4, and 255-5 may be constituted by movable STAs and are not permitted to access the DS to constitute a self-contained network.

FIG. 3 illustrates a general link setup process.

In S310, a STA may perform a network discovery operation. The network discovery operation may include a scanning operation of the STA. That is, to access a network, the STA needs to discover a participating network. The STA needs to identify a compatible network before participating in a wireless network, and a process of identifying a network present in a particular area is referred to as scanning Scanning methods include active scanning and passive scanning.

FIG. 3 illustrates a network discovery operation including an active scanning process. In active scanning, a STA performing scanning transmits a probe request frame and waits for a response to the probe request frame in order to identify which AP is present around while moving to channels. A responder transmits a probe response frame as a response to the probe request frame to the STA having transmitted the probe request frame. Here, the responder may be a STA that transmits the last beacon frame in a BSS of a channel being scanned. In the BSS, since an AP transmits a beacon frame, the AP is the responder. In an IBSS, since STAs in the IBSS transmit a beacon frame in turns, the responder is not fixed. For example, when the STA transmits a probe request frame via channel 1 and receives a probe response frame via channel 1, the STA may store BSS-related information included in the received probe response frame, may move to the next channel (e.g., channel 2), and may perform scanning (e.g., transmits a probe request and receives a probe response via channel 2) by the same method.

Although not shown in FIG. 3, scanning may be performed by a passive scanning method. In passive scanning, a STA performing scanning may wait for a beacon frame while moving to channels. A beacon frame is one of management frames in IEEE 802.11 and is periodically transmitted to indicate the presence of a wireless network and to enable the STA performing scanning to find the wireless network and to participate in the wireless network. In a BSS, an AP serves to periodically transmit a beacon frame. In an IBSS, STAs in the IBSS transmit a beacon frame in turns. Upon receiving the beacon frame, the STA performing scanning stores information related to a BSS included in the beacon frame and records beacon frame information in each channel while moving to another channel. The STA having received the beacon frame may store BSS-related information included in the received beacon frame, may move to the next channel, and may perform scanning in the next channel by the same method.

After discovering the network, the STA may perform an authentication process in S320. The authentication process may be referred to as a first authentication process to be clearly distinguished from the following security setup operation in S340. The authentication process in S320 may include a process in which the STA transmits an authentication request frame to the AP and the AP transmits an authentication response frame to the STA in response. The authentication frames used for an authentication request/response are management frames.

The authentication frames may include information related to an authentication algorithm number, an authentication transaction sequence number, a status code, a challenge text, a robust security network (RSN), and a finite cyclic group.

The STA may transmit the authentication request frame to the AP. The AP may determine whether to allow the authentication of the STA based on the information included in the received authentication request frame. The AP may provide the authentication processing result to the STA via the authentication response frame.

When the STA is successfully authenticated, the STA may perform an association process in S330. The association process includes a process in which the STA transmits an association request frame to the AP and the AP transmits an association response frame to the STA in response. The association request frame may include, for example, information related to various capabilities, a beacon listen interval, a service set identifier (SSID), a supported rate, a supported channel, RSN, a mobility domain, a supported operating class, a traffic indication map (TIM) broadcast request, and an interworking service capability. The association response frame may include, for example, information related to various capabilities, a status code, an association ID (AID), a supported rate, an enhanced distributed channel access (EDCA) parameter set, a received channel power indicator (RCPI), a received signal-to-noise indicator (RSNI), a mobility domain, a timeout interval (association comeback time), an overlapping BSS scanning parameter, a TIM broadcast response, and a QoS map.

In S340, the STA may perform a security setup process. The security setup process in S340 may include a process of setting up a private key through four-way handshaking, for example, through an extensible authentication protocol over LAN (EAPOL) frame.

FIG. 4 illustrates an example of a PPDU used in an IEEE standard.

As illustrated in FIG. 4, various types of PHY protocol data units (PPDUs) are used in IEEE a/g/n/ac standards. Specifically, an LTF and a STF include a training signal, a SIG-A and a SIG-B include control information for a receiving STA, and a data field includes user data corresponding to a PSDU (MAC PDU/aggregated MAC PDU).

FIG. 4 also includes an example of an HE PPDU according to IEEE 802.11ax. The HE PPDU according to FIG. 4 is an illustrative PPDU for multiple users. An HE-SIG-B may be included only in a PPDU for multiple users, and an HE-SIG-B may be omitted in a PPDU for a single user.

As illustrated in FIG. 4, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, a MAC payload), and a packet extension (PE) field. The respective fields may be transmitted for illustrated time periods (i.e., 4 or 8 μs).

Hereinafter, a resource unit (RU) used for a PPDU is described. An RU may include a plurality of subcarriers (or tones). An RU may be used to transmit a signal to a plurality of STAs according to OFDMA. Further, an RU may also be defined to transmit a signal to one STA. An RU may be used for an STF, an LTF, a data field, or the like.

Figure 5:
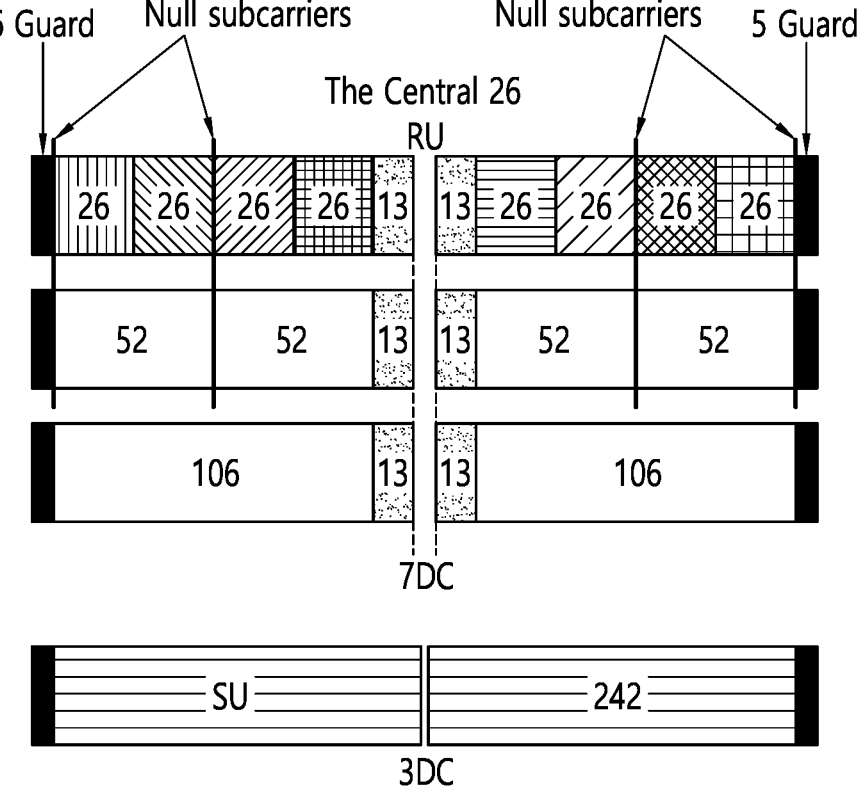
FIG. 5 illustrates a layout of resource units (RUs) used in a band of 20 MHz.

FIG. 5 illustrates a layout of resource units (RUs) used in a band of 20 MHz.

As illustrated in FIG. 5, resource units (RUs) corresponding to different numbers of tones (i.e., subcarriers) may be used to form some fields of an HE-PPDU. For example, resources may be allocated in illustrated RUs for an HE-STF, an HE-LTF, and a data field.

As illustrated in the uppermost part of FIG. 5, a 26-unit (i.e., a unit corresponding to 26 tones) may be disposed. Six tones may be used for a guard band in the leftmost band of the 20 MHz band, and five tones may be used for a guard band in the rightmost band of the 20 MHz band. Further, seven DC tones may be inserted in a center band, that is, a DC band, and a 26-unit corresponding to 13 tones on each of the left and right sides of the DC band may be disposed. A 26-unit, a 52-unit, and a 106-unit may be allocated to other bands. Each unit may be allocated for a receiving STA, that is, a user.

The layout of the RUs in FIG. 5 may be used not only for a multiple users (MUs) but also for a single user (SU), in which case one 242-unit may be used and three DC tones may be inserted as illustrated in the lowermost part of FIG. 5.

Although FIG. 5 proposes RUs having various sizes, that is, a 26-RU, a 52-RU, a 106-RU, and a 242-RU, specific sizes of RUs may be extended or increased. Therefore, the present embodiment is not limited to the specific size of each RU (i.e., the number of corresponding tones).

FIG. 6 illustrates a layout of RUs used in a band of 40 MHz.

Similarly to FIG. 5 in which RUs having various sizes are used, a 26-RU, a 52-RU, a 106-RU, a 242-RU, a 484-RU, and the like may be used in an example of FIG. 6. Further, five DC tones may be inserted in a center frequency, 12 tones may be used for a guard band in the leftmost band of the 40 MHz band, and 11 tones may be used for a guard band in the rightmost band of the 40 MHz band.

As illustrated in FIG. 6, when the layout of the RUs is used for a single user, a 484-RU may be used. The specific number of RUs may be changed similarly to FIG. 5.

Figure 7:
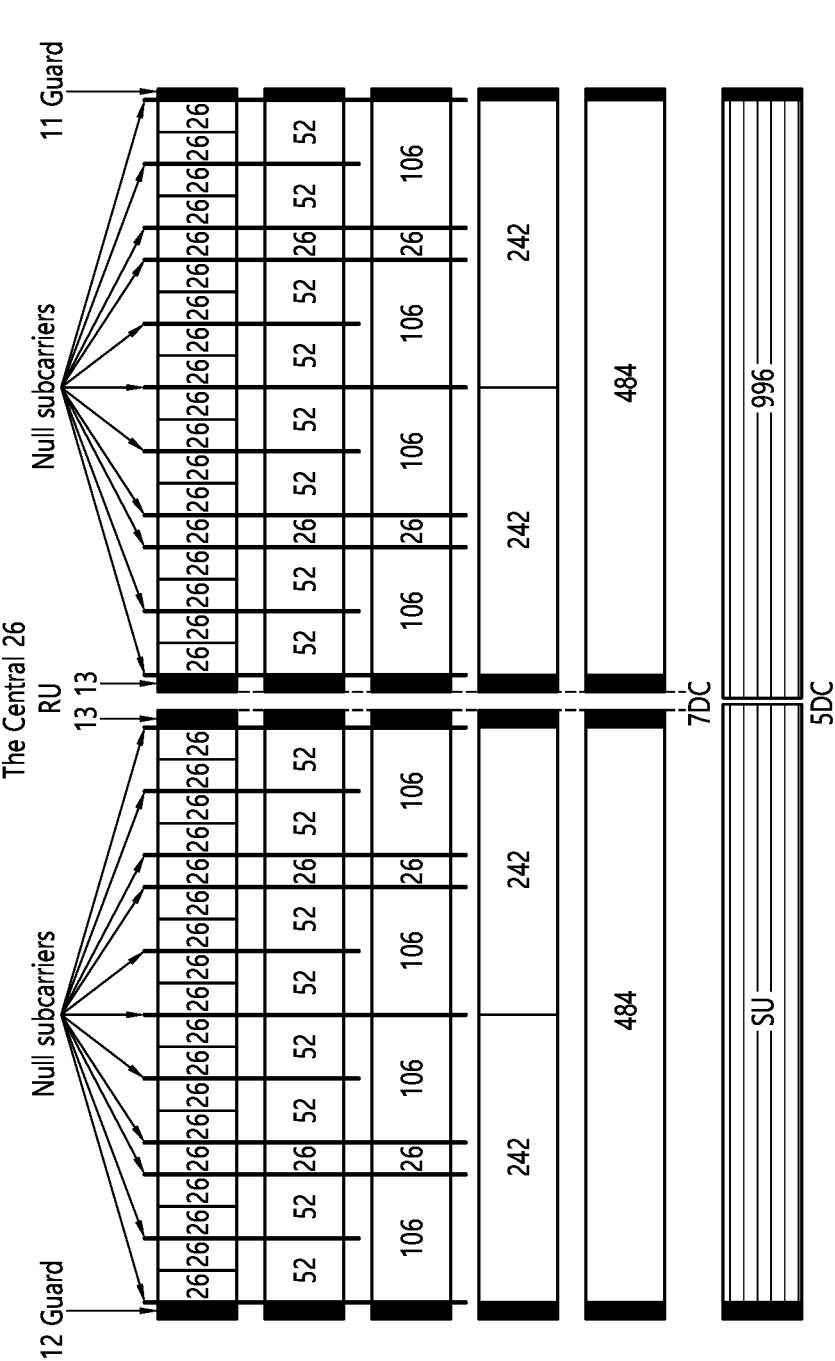
FIG. 7 illustrates a layout of RUs used in a band of 80 MHz.

FIG. 7 illustrates a layout of RUs used in a band of 80 MHz.

Similarly to FIG. 5 and FIG. 6 in which RUs having various sizes are used, a 26-RU, a 52-RU, a 106-RU, a 242-RU, a 484-RU, a 996-RU, and the like may be used in an example of FIG. 7. Further, seven DC tones may be inserted in the center frequency, 12 tones may be used for a guard band in the leftmost band of the 80 MHz band, and 11 tones may be used for a guard band in the rightmost band of the 80 MHz band. In addition, a 26-RU corresponding to 13 tones on each of the left and right sides of the DC band may be used.

As illustrated in FIG. 7, when the layout of the RUs is used for a single user, a 996-RU may be used, in which case five DC tones may be inserted.

The RU described in the present specification may be used in uplink (UL) communication and downlink (DL) communication. For example, when UL-MU communication which is solicited by a trigger frame is performed, a transmitting STA (e.g., AP) may allocate a first RU (e.g., 26/52/106/242-RU, etc.) to a first STA through the trigger frame, and may allocate a second RU (e.g., 26/52/106/242-RU, etc.) to a second STA. Thereafter, the first STA may transmit a first trigger-based PPDU based on the first RU, and the second STA may transmit a second trigger-based PPDU based on the second RU. The first/second trigger-based PPDU is transmitted to the AP at the same (or overlapped) time period.

For example, when a DL MU PPDU is configured, the transmitting STA (e.g., AP) may allocate the first RU (e.g., 26/52/106/242-RU, etc.) to the first STA, and may allocate the second RU (e.g., 26/52/106/242-RU, etc.) to the second STA. That is, the transmitting STA (e.g., AP) may transmit HE-STF, HE-LTF, and Data fields for the first STA through the first RU in one MU PPDU, and may transmit HE-STF, HE-LTF, and Data fields for the second STA through the second RU.

Information related to a layout of the RU may be signaled through HE-SIG-B.

Figure 8:
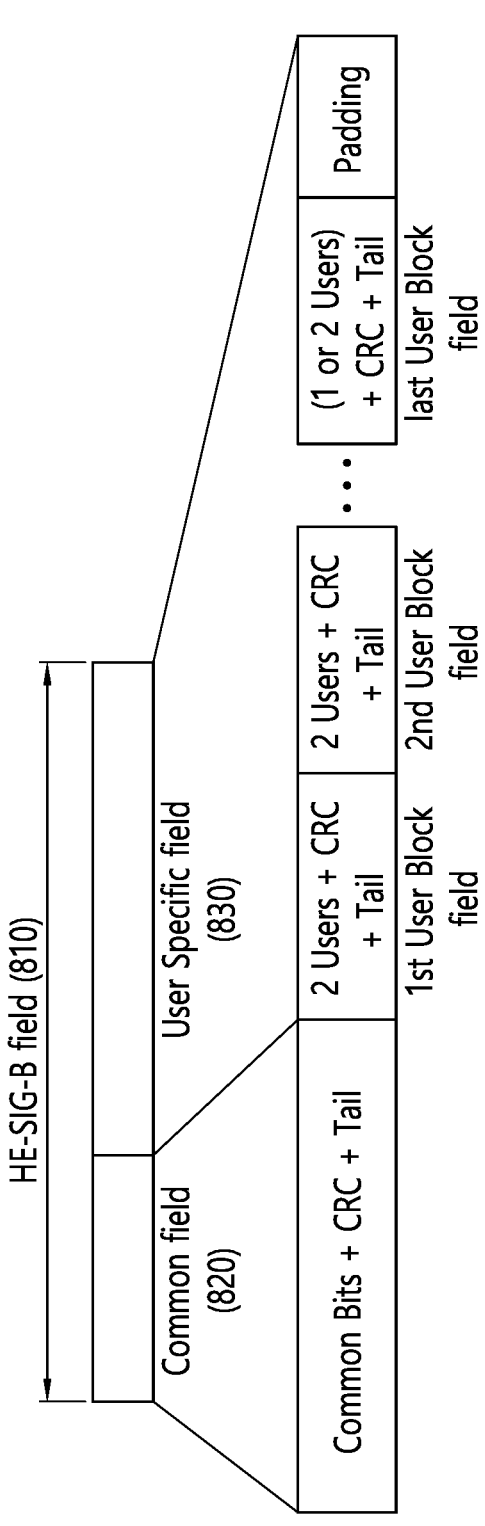
FIG. 8 illustrates a structure of an HE-SIG-B field.

FIG. 8 illustrates a structure of an HE-SIG-B field.

As illustrated, an HE-SIG-B field 810 includes a common field 820 and a user-specific field 830. The common field 820 may include information commonly applied to all users (i.e., user STAs) which receive SIG-B. The user-specific field 830 may be called a user-specific control field. When the SIG-B is transferred to a plurality of users, the user-specific field 830 may be applied only any one of the plurality of users.

As illustrated in FIG. 8, the common field 820 and the user-specific field 830 may be separately encoded.

The common field 820 may include RU allocation information of N*8 bits. For example, the RU allocation information may include information related to a location of an RU. For example, when a 20 MHz channel is used as shown in FIG. 5, the RU allocation information may include information related to a specific frequency band to which a specific RU (26-RU/52-RU/106-RU) is arranged.

An example of a case in which the RU allocation information consists of 8 bits is as follows.

TABLE 1

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 00000000 | 26 | 26 | 26 | 26 | 26 | 26 | 26 | 26 | 26 | 1 |
| 00000001 | 26 | 26 | 26 | 26 | 26 | 26 | 52 | | | 1 |
| 00000010 | 26 | 26 | 26 | 26 | 26 | 52 | 26 | 26 | | 1 |
| 00000011 | 26 | 26 | 26 | 26 | 26 | 52 | 52 | | | 1 |
| 00000100 | 26 | 26 | 52 | 26 | 26 | 26 | 26 | 26 | | 1 |
| 00000101 | 26 | 26 | 52 | 26 | 26 | 26 | 52 | | | 1 |
| 00000110 | 26 | 26 | 52 | 26 | 52 | 26 | 26 | | | 1 |

TABLE 1-continued

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 00000111 | 26 | 26 | 52 | 26 | 52 | | 52 | | | 1 |
| 00001000 | | 52 | 26 | 26 | 26 | 26 | 26 | 26 | 26 | 1 |

As shown the example of FIG. 5, up to nine 26-RUs may be allocated to the 20 MHz channel. When the RU allocation information of the common field 820 is set to "00000000" as shown in Table 1, the nine 26-RUs may be allocated to a corresponding channel (i.e., 20 MHz). In addition, when the RU allocation information of the common field 820 is set to "00000001" as shown in Table 1, seven 26-RUs and one 52-RU are arranged in a corresponding channel. That is, in the example of FIG. 5, the 52-RU may be allocated to the rightmost side, and the seven 26-RUs may be allocated to the left thereof.

The example of Table 1 shows only some of RU locations capable of displaying the RU allocation information.

For example, the RU allocation information may include an example of Table 2 below.

TABLE 2

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| $01000y_2y_1y_0$ | | | 106 | | 26 | 26 | 26 | 26 | 26 | 8 |
| $01001y_2y_1y_0$ | | | 106 | | 26 | 26 | 26 | 52 | | 8 |

"$01000y_2y_1y_0$" relates to an example in which a 106-RU is allocated to the leftmost side of the 20 MHz channel, and five 26-RUs are allocated to the right side thereof. In this case, a plurality of STAs (e.g., user-STAs) may be allocated to the 106-RU, based on a MU-MIMO scheme. Specifically, up to 8 STAs (e.g., user-STAs) may be allocated to the 106-RU, and the number of STAs (e.g., user-STAs) allocated to the 106-RU is determined based on 3-bit information $(y_2y_1y_0)$. For example, when the 3-bit information $(y_2y_1y_0)$ is set to N, the number of STAs (e.g., user-STAs) allocated to the 106-RU based on the MU-MIMO scheme may be N+1.

In general, a plurality of STAs (e.g., user STAs) different from each other may be allocated to a plurality of RUs. However, the plurality of STAs (e.g., user STAs) may be allocated to one or more RUs having at least a specific size (e.g., 106 subcarriers), based on the MU-MIMO scheme.

As shown in FIG. 8, the user-specific field 830 may include a plurality of user fields. As described above, the number of STAs (e.g., user STAs) allocated to a specific channel may be determined based on the RU allocation information of the common field 820. For example, when the RU allocation information of the common field 820 is "00000000", one user STA may be allocated to each of nine 26-RUs (e.g., nine user STAs may be allocated). That is, up to 9 user STAs may be allocated to a specific channel through an OFDMA scheme. In other words, up to 9 user STAs may be allocated to a specific channel through a non-MU-MIMO scheme.

For example, when RU allocation is set to "$01000y_2y_1y_0$", a plurality of STAs may be allocated to the 106-RU arranged at the leftmost side through the MU-MIMO scheme, and five user STAs may be allocated to five 26-RUs arranged to the right side thereof through the non-MU MIMO scheme. This case is specified through an example of FIG. 9.

Figure 9:
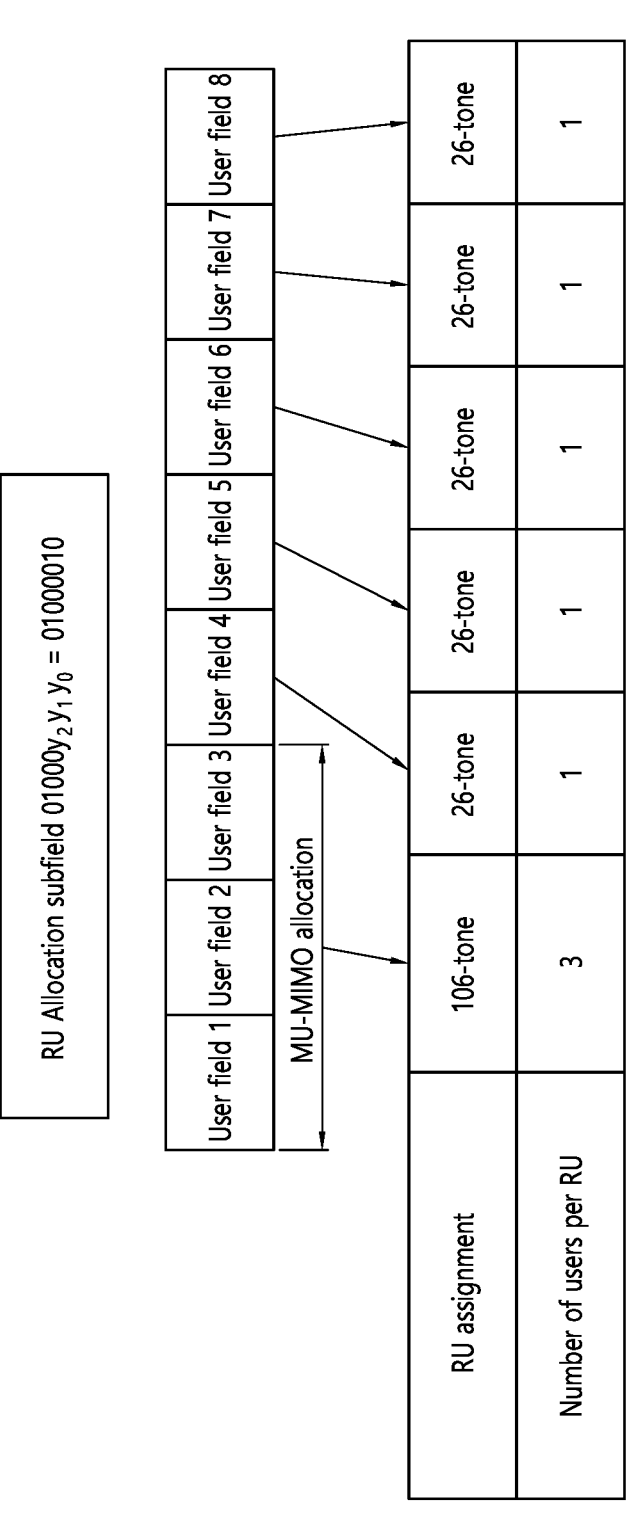
FIG. 9 illustrates an example in which a plurality of user STAs are allocated to the same RU through a MU-MIMO scheme.

FIG. 9 illustrates an example in which a plurality of user STAs are allocated to the same RU through a MU-MIMO scheme.

For example, when RU allocation is set to "01000010" as shown in FIG. 9, a 106-RU may be allocated to the leftmost side of a specific channel, and five 26-RUs may be allocated to the right side thereof. In addition, three user STAs may be allocated to the 106-RU through the MU-MIMO scheme. As a result, since eight user STAs are allocated, the user-specific field 830 of HE-SIG-B may include eight user fields.

The eight user fields may be expressed in the order shown in FIG. 9. In addition, as shown in FIG. 8, two user fields may be implemented with one user block field.

The user fields shown in FIG. 8 and FIG. 9 may be configured based on two formats. That is, a user field related to a MU-MIMO scheme may be configured in a first format, and a user field related to a non-MIMO scheme may be configured in a second format. Referring to the example of FIG. 9, a user field 1 to a user field 3 may be based on the first format, and a user field 4 to a user field 8 may be based on the second format. The first format or the second format may include bit information of the same length (e.g., 21 bits).

Each user field may have the same size (e.g., 21 bits). For example, the user field of the first format (the first of the MU-MIMO scheme) may be configured as follows.

For example, a first bit (i.e., B0-B10) in the user field (i.e., 21 bits) may include identification information (e.g., STA-ID, partial AID, etc.) of a user STA to which a corresponding user field is allocated. In addition, a second bit (i.e., B11-B14) in the user field (i.e., 21 bits) may include information related to a spatial configuration.

In addition, a third bit (i.e., B15-18) in the user field (i.e., 21 bits) may include modulation and coding scheme (MCS) information. The MCS information may be applied to a data field in a PPDU including corresponding SIG-B.

An MCS, MCS information, an MCS index, an MCS field, or the like used in the present specification may be indicated by an index value. For example, the MCS information may be indicated by an index 0 to an index 11. The MCS information may include information related to a constellation modulation type (e.g., BPSK, QPSK, 16-QAM, 64-QAM, 256-QAM, 1024-QAM, etc.) and information related to a coding rate (e.g., 1/2, 2/3, 3/4, 5/6e, etc.). Information related to a channel coding type (e.g., LCC or LDPC) may be excluded in the MCS information.

In addition, a fourth bit (i.e., B19) in the user field (i.e., 21 bits) may be a reserved field.

In addition, a fifth bit (i.e., B20) in the user field (i.e., 21 bits) may include information related to a coding type (e.g., BCC or LDPC). That is, the fifth bit (i.e., B20) may include information related to a type (e.g., BCC or LDPC) of channel coding applied to the data field in the PPDU including the corresponding SIG-B.

The aforementioned example relates to the user field of the first format (the format of the MU-MIMO scheme). An example of the user field of the second format (the format of the non-MU-MIMO scheme) is as follows.

A first bit (e.g., B0-B10) in the user field of the second format may include identification information of a user STA. In addition, a second bit (e.g., B11-B13) in the user field of the second format may include information related to the number of spatial streams applied to a corresponding RU. In addition, a third bit (e.g., B14) in the user field of the second format may include information related to whether a beam-forming steering matrix is applied. A fourth bit (e.g., B15-B18) in the user field of the second format may include modulation and coding scheme (MCS) information. In addition, a fifth bit (e.g., B19) in the user field of the second format may include information related to whether dual carrier modulation (DCM) is applied. In addition, a sixth bit (i.e., B20) in the user field of the second format may include information related to a coding type (e.g., BCC or LDPC).

Hereinafter, a PPDU transmitted/received in a STA of the present specification will be described.

Figure 10:
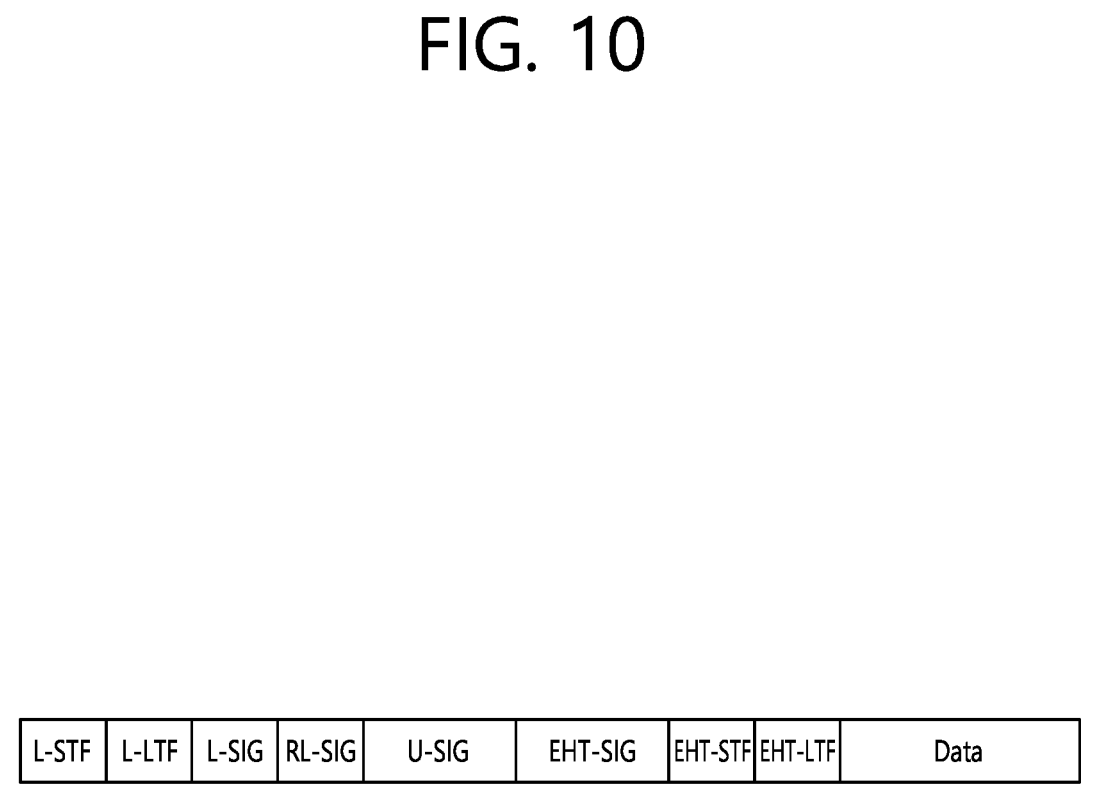

FIG. 10 illustrates an example of a PPDU used in the present specification.

The PPDU of FIG. 10 may be called in various terms such as an EHT PPDU, a TX PPDU, an RX PPDU, a first type or N-th type PPDU, or the like. For example, in the present specification, the PPDU or the EHT PPDU may be called in various terms such as a TX PPDU, a RX PPDU, a first type or N-th type PPDU, or the like. In addition, the EHT PPDU may be used in an EHT system and/or a new WLAN system enhanced from the EHT system.

The PPDU of FIG. 10 may indicate the entirety or part of a PPDU type used in the EHT system. For example, the example of FIG. 10 may be used for both of a single-user (SU) mode and a multi-user (MU) mode. In other words, the PPDU of FIG. 10 may be a PPDU for one receiving STA or a plurality of receiving STAs. When the PPDU of FIG. 10 is used for a trigger-based (TB) mode, the EHT-SIG of FIG. 10 may be omitted. In other words, an STA which has received a trigger frame for uplink-MU (UL-MU) may transmit the PPDU in which the EHT-SIG is omitted in the example of FIG. 10.

In FIG. 10, an L-STF to an EHT-LTF may be called a preamble or a physical preamble, and may be generated/transmitted/received/obtained/decoded in a physical layer.

A subcarrier spacing of the L-STF, L-LTF, L-SIG, RL-SIG, U-SIG, and EHT-SIG fields of FIG. 10 may be determined as 312.5 kHz, and a subcarrier spacing of the EHT-STF, EHT-LTF, and Data fields may be determined as 78.125 kHz. That is, a tone index (or subcarrier index) of the L-STF, L-LTF, L-SIG, RL-SIG, U-SIG, and EHT-SIG fields may be expressed in unit of 312.5 kHz, and a tone index (or subcarrier index) of the EHT-STF, EHT-LTF, and Data fields may be expressed in unit of 78.125 kHz.

In the PPDU of FIG. 10, the L-LTE and the L-STF may be the same as those in the conventional fields.

The L-SIG field of FIG. 10 may include, for example, bit information of 24 bits. For example, the 24-bit information may include a rate field of 4 bits, a reserved bit of 1 bit, a length field of 12 bits, a parity bit of 1 bit, and a tail bit of 6 bits. For example, the length field of 12 bits may include information related to a length or time duration of a PPDU. For example, the length field of 12 bits may be determined based on a type of the PPDU. For example, when the PPDU is a non-HT, HT, VHT PPDU or an EHT PPDU, a value of the length field may be determined as a multiple of 3. For example, when the PPDU is an HE PPDU, the value of the length field may be determined as "a multiple of 3"+1 or "a multiple of 3"+2. In other words, for the non-HT, HT, VHT PPDI or the EHT PPDU, the value of the length field may be determined as a multiple of 3, and for the HE PPDU, the value of the length field may be determined as "a multiple of 3"+1 or "a multiple of 3"+2.

For example, the transmitting STA may apply BCC encoding based on a 1/2 coding rate to the 24-bit information of the L-SIG field. Thereafter, the transmitting STA may obtain a BCC coding bit of 48 bits. BPSK modulation may be applied to the 48-bit coding bit, thereby generating 48 BPSK symbols. The transmitting STA may map the 48 BPSK symbols to positions except for a pilot subcarrier {subcarrier index −21, −7, +7, +21} and a DC subcarrier {subcarrier index 0}. As a result, the 48 BPSK symbols may be mapped to subcarrier indices −26 to −22, −20 to −8, −6 to −1, +1 to +6, +8 to +20, and +22 to +26. The transmitting STA may additionally map a signal of {−1, −1, −1, 1} to a subcarrier index {−28, −27, +27, +28}. The aforementioned signal may be used for channel estimation on a frequency domain corresponding to {−28, −27, +27, +28}.

The transmitting STA may generate an RL-SIG generated in the same manner as the L-SIG. BPSK modulation may be applied to the RL-SIG. The receiving STA may know that the RX PPDU is the HE PPDU or the EHT PPDU, based on the presence of the RL-SIG.

A universal SIG (U-SIG) may be inserted after the RL-SIG of FIG. 10. The U-SIB may be called in various terms such as a first SIG field, a first SIG, a first type SIG, a control signal, a control signal field, a first (type) control signal, or the like.

The U-SIG may include information of N bits, and may include information for identifying a type of the EHT PPDU. For example, the U-SIG may be configured based on two symbols (e.g., two contiguous OFDM symbols). Each symbol (e.g., OFDM symbol) for the U-SIG may have a duration of 4 us. Each symbol of the U-SIG may be used to transmit the 26-bit information. For example, each symbol of the U-SIG may be transmitted/received based on 52 data tomes and 4 pilot tones.

Through the U-SIG (or U-SIG field), for example, A-bit information (e.g., 52 un-coded bits) may be transmitted. A first symbol of the U-SIG may transmit first X-bit information (e.g., 26 un-coded bits) of the A-bit information, and a second symbol of the U-SIB may transmit the remaining Y-bit information (e.g. 26 un-coded bits) of the A-bit information. For example, the transmitting STA may obtain 26 un-coded bits included in each U-SIG symbol. The transmitting STA may perform convolutional encoding (i.e., BCC encoding) based on a rate of R=1/2 to generate 52-coded bits, and may perform interleaving on the 52-coded bits. The transmitting STA may perform BPSK modulation on the interleaved 52-coded bits to generate 52 BPSK symbols to be allocated to each U-SIG symbol. One U-SIG symbol may be transmitted based on 65 tones (subcarriers) from a subcarrier index −28 to a subcarrier index +28, except for a DC index 0. The 52 BPSK symbols generated by the transmitting STA may be transmitted based on the remaining tones (subcarriers) except for pilot tones, i.e., tones −21, −7, +7, +21.

For example, the A-bit information (e.g., 52 un-coded bits) generated by the U-SIG may include a CRC field (e.g., a field having a length of 4 bits) and a tail field (e.g., a field having a length of 6 bits). The CRC field and the tail field may be transmitted through the second symbol of the U-SIG. The CRC field may be generated based on 26 bits allocated to the first symbol of the U-SIG and the remaining 16 bits except for the CRC/tail fields in the second symbol, and may be generated based on the conventional CRC calculation algorithm. In addition, the tail field may be used to terminate trellis of a convolutional decoder, and may be set to, for example, "000000".

The A-bit information (e.g., 52 un-coded bits) transmitted by the U-SIG (or U-SIG field) may be divided into version-independent bits and version-dependent bits. For example, the version-independent bits may have a fixed or variable size. For example, the version-independent bits may be allocated only to the first symbol of the U-SIG, or the version-independent bits may be allocated to both of the first and second symbols of the U-SIG. For example, the version-independent bits and the version-dependent bits may be called in various terms such as a first control bit, a second control bit, or the like.

For example, the version-independent bits of the U-SIG may include a PHY version identifier of 3 bits. For example, the PHY version identifier of 3 bits may include information related to a PHY version of a TX/RX PPDU. For example, a first value of the PHY version identifier of 3 bits may indicate that the TX/RX PPDU is an EHT PPDU. In other words, when the transmitting STA transmits the EHT PPDU, the PHY version identifier of 3 bits may be set to a first value. In other words, the receiving STA may determine that the RX PPDU is the EHT PPDU, based on the PHY version identifier having the first value.

For example, the version-independent bits of the U-SIG may include a UL/DL flag field of 1 bit. A first value of the UL/DL flag field of 1 bit relates to UL communication, and a second value of the UL/DL flag field relates to DL communication.

For example, the version-independent bits of the U-SIG may include information related to a TXOP length and information related to a BSS color ID.

For example, when the EHT PPDU is divided into various types (e.g., various types such as an EHT PPDU related to an SU mode, an EHT PPDU related to a MU mode, an EHT PPDU related to a TB mode, an EHT PPDU related to extended range transmission, or the like), information related to the type of the EHT PPDU may be included in the version-dependent bits of the U-SIG.

For example, the U-SIG may include: 1) a bandwidth field including information related to a bandwidth; 2) a field including information related to an MCS scheme applied to EHT-SIG; 3) an indication field including information regarding whether a dual subcarrier modulation (DCM) scheme is applied to EHT-SIG; 4) a field including information related to the number of symbol used for EHT-SIG; 5) a field including information regarding whether the EHT-SIG is generated across a full band; 6) a field including information related to a type of EHT-LTF/STF; and 7) information related to a field indicating an EHT-LTF length and a CP length.

Preamble puncturing may be applied to the PPDU of FIG. 10. The preamble puncturing implies that puncturing is applied to part (e.g., a secondary 20 MHz band) of the full band. For example, when an 80 MHz PPDU is transmitted, an STA may apply puncturing to the secondary 20 MHz band out of the 80 MHz band, and may transmit a PPDU only through a primary 20 MHz band and a secondary 40 MHz band.

For example, a pattern of the preamble puncturing may be configured in advance. For example, when a first puncturing pattern is applied, puncturing may be applied only to the secondary 20 MHz band within the 80 MHz band. For example, when a second puncturing pattern is applied, puncturing may be applied to only any one of two secondary 20 MHz bands included in the secondary 40 MHz band within the 80 MHz band. For example, when a third puncturing pattern is applied, puncturing may be applied to only the secondary 20 MHz band included in the primary 80 MHz band within the 160 MHz band (or 80+80 MHz band). For example, when a fourth puncturing is applied, puncturing may be applied to at least one 20 MHz channel not belonging to a primary 40 MHz band in the presence of the primary 40 MHz band included in the 80 MHz band within the 160 MHz band (or 80+80 MHz band).

Information related to the preamble puncturing applied to the PPDU may be included in U-SIG and/or EHT-SIG. For example, a first field of the U-SIG may include information related to a contiguous bandwidth, and second field of the U-SIG may include information related to the preamble puncturing applied to the PPDU.

For example, the U-SIG and the EHT-SIG may include the information related to the preamble puncturing, based on the following method. When a bandwidth of the PPDU exceeds 80 MHz, the U-SIG may be configured individually in unit of 80 MHz. For example, when the bandwidth of the PPDU is 160 MHz, the PPDU may include a first U-SIG for a first 80 MHz band and a second U-SIG for a second 80 MHz band. In this case, a first field of the first U-SIG may include information related to a 160 MHz bandwidth, and a second field of the first U-SIG may include information related to a preamble puncturing (i.e., information related to a preamble puncturing pattern) applied to the first 80 MHz band. In addition, a first field of the second U-SIG may include information related to a 160 MHz bandwidth, and a second field of the second U-SIG may include information related to a preamble puncturing (i.e., information related to a preamble puncturing pattern) applied to the second 80 MHz band. Meanwhile, an EHT-SIG contiguous to the first U-SIG may include information related to a preamble puncturing applied to the second 80 MHz band (i.e., information related to a preamble puncturing pattern), and an EHT-SIG contiguous to the second U-SIG may include information related to a preamble puncturing (i.e., information related to a preamble puncturing pattern) applied to the first 80 MHz band.

Additionally or alternatively, the U-SIG and the EHT-SIG may include the information related to the preamble puncturing, based on the following method. The U-SIG may include information related to a preamble puncturing (i.e., information related to a preamble puncturing pattern) for all bands. That is, the EHT-SIG may not include the information related to the preamble puncturing, and only the U-SIG may include the information related to the preamble puncturing (i.e., the information related to the preamble puncturing pattern).

The U-SIG may be configured in unit of 20 MHz. For example, when an 80 MHz PPDU is configured, the U-SIG may be duplicated. That is, four identical U-SIGs may be included in the 80 MHz PPDU. PPDUs exceeding an 80 MHz bandwidth may include different U-SIGs.

The EHT-SIG of FIG. 10 may include control information for the receiving STA. The EHT-SIG may be transmitted through at least one symbol, and one symbol may have a length of 4 us. Information related to the number of symbols used for the EHT-SIG may be included in the U-SIG.

The EHT-SIG may include a technical feature of the HE-SIG-B described with reference to FIG. 8 and FIG. 9. For example, the EHT-SIG may include a common field and a user-specific field as in the example of FIG. 8. The common field of the EHT-SIG may be omitted, and the number of user-specific fields may be determined based on the number of users.

As in the example of FIG. 8, the common field of the EHT-SIG and the user-specific field of the EHT-SIG may be individually coded. One user block field included in the user-specific field may include information for two users, but a last user block field included in the user-specific field may include information for one user. That is, one user block field of the EHT-SIG may include up to two user fields. As in the example of FIG. 9, each user field may be related to MU-MIMO allocation, or may be related to non-MU-MIMO allocation.

As in the example of FIG. 8, the common field of the EHT-SIG may include a CRC bit and a tail bit. A length of the CRC bit may be determined as 4 bits. A length of the tail bit may be determined as 6 bits, and may be set to '000000'.

As in the example of FIG. 8, the common field of the EHT-SIG may include RU allocation information. The RU allocation information may imply information related to a location of an RU to which a plurality of users (i.e., a plurality of receiving STAs) are allocated. The RU allocation information may be configured in unit of 8 bits (or N bits), as in Table 1.

A mode in which the common field of the EHT-SIG is omitted may be supported. The mode in which the common field of the EHT-SIG is omitted may be called a compressed mode. When the compressed mode is used, a plurality of users (i.e., a plurality of receiving STAs) may decode the PPDU (e.g., the data field of the PPDU), based on non-OFDMA. That is, the plurality of users of the EHT PPDU may decode the PPDU (e.g., the data field of the PPDU) received through the same frequency band. Meanwhile, when a non-compressed mode is used, the plurality of users of the EHT PPDU may decode the PPDU (e.g., the data field of the PPDU), based on OFDMA. That is, the plurality of users of the EHT PPDU may receive the PPDU (e.g., the data field of the PPDU) through different frequency bands.

The EHT-SIG may be configured based on various MCS schemes. As described above, information related to an MCS scheme applied to the EHT-SIG may be included in U-SIG. The EHT-SIG may be configured based on a DCM scheme. For example, among N data tones (e.g., 52 data tones) allocated for the EHT-SIG, a first modulation scheme may be applied to half of contiguous tones, and a second modulation scheme may be applied to the remaining half of the contiguous tones. That is, a transmitting STA may use the first modulation scheme to modulate specific control information through a first symbol and allocate it to half of the contiguous tones, and may use the second modulation scheme to modulate the same control information by using a second symbol and allocate it to the remaining half of the contiguous tones. As described above, information (e.g., a 1-bit field) regarding whether the DCM scheme is applied to the EHT-SIG may be included in the U-SIG. An HE-STF of FIG. 10 may be used for improving automatic gain control estimation in a multiple input multiple output (MIMO) environment or an OFDMA environment. An HE-LTF of FIG. 10 may be used for estimating a channel in the MIMO environment or the OFDMA environment.

Information related to a type of STF and/or LTF (information related to a GI applied to LTF is also included) may be included in a SIG-A field and/or SIG-B field or the like of FIG. 10.

A PPDU (e.g., EHT-PPDU) of FIG. 10 may be configured based on the example of FIG. 5 and FIG. 6.

For example, an EHT PPDU transmitted on a 20 MHz band, i.e., a 20 MHz EHT PPDU, may be configured based on the RU of FIG. 5. That is, a location of an RU of EHT-STF, EHT-LTF, and data fields included in the EHT PPDU may be determined as shown in FIG. 5.

An EHT PPDU transmitted on a 40 MHz band, i.e., a 40 MHz EHT PPDU, may be configured based on the RU of FIG. 6. That is, a location of an RU of EHT-STF, EHT-LTF, and data fields included in the EHT PPDU may be determined as shown in FIG. 6.

Since the RU location of FIG. 6 corresponds to 40 MHz, a tone-plan for 80 MHz may be determined when the pattern of FIG. 6 is repeated twice. That is, an 80 MHz EHT PPDU may be transmitted based on a new tone-plan in which not the RU of FIG. 7 but the RU of FIG. 6 is repeated twice.

When the pattern of FIG. 6 is repeated twice, 23 tones (i.e., 11 guard tones+12 guard tones) may be configured in a DC region. That is, a tone-plan for an 80 MHz EHT PPDU allocated based on OFDMA may have 23 DC tones. Unlike this, an 80 MHz EHT PPDU allocated based on non-OFDMA (i.e., a non-OFDMA full bandwidth 80 MHz PPDU) may be configured based on a 996-RU, and may include 5 DC tones, 12 left guard tones, and 11 right guard tones.

A tone-plan for 160/240/320 MHz may be configured in such a manner that the pattern of FIG. 6 is repeated several times.

The PPDU of FIG. 10 may be determined (or identified) as an EHT PPDU based on the following method.

A receiving STA may determine a type of an RX PPDU as the EHT PPDU, based on the following aspect. For example, the RX PPDU may be determined as the EHT PPDU: 1) when a first symbol after an L-LTF signal of the RX PPDU is a BPSK symbol; 2) when RL-SIG in which the L-SIG of the RX PPDU is repeated is detected; and 3) when a result of applying "modulo 3" to a value of a length field of the L-SIG of the RX PPDU is detected as "0". When the RX PPDU is determined as the EHT PPDU, the receiving STA may detect a type of the EHT PPDU (e.g., an SU/MU/Trigger-based/Extended Range type), based on bit information included in a symbol after the RL-SIG of FIG. 10. In other words, the receiving STA may determine the RX PPDU as the EHT PPDU, based on: 1) a first symbol after an L-LTF signal, which is a BPSK symbol; 2) RL-SIG contiguous to the L-SIG field and identical to L-SIG; 3) L-SIG including a length field in which a result of applying "modulo 3" is set to "0"; and 4) a 3-bit PHY version identifier of the aforementioned U-SIG (e.g., a PHY version identifier having a first value).

For example, the receiving STA may determine the type of the RX PPDU as the EHT PPDU, based on the following aspect. For example, the RX PPDU may be determined as the HE PPDU: 1) when a first symbol after an L-LTF signal is a BPSK symbol; 2) when RL-SIG in which the L-SIG is repeated is detected; and 3) when a result of applying "modulo 3" to a value of a length field of the L-SIG is detected as "1" or "2".

For example, the receiving STA may determine the type of the RX PPDU as a non-HT, HT, and VHT PPDU, based on the following aspect. For example, the RX PPDU may be determined as the non-HT, HT, and VHT PPDU: 1) when a first symbol after an L-LTF signal is a BPSK symbol; and 2) when RL-SIG in which L-SIG is repeated is not detected. In addition, even if the receiving STA detects that the RL-SIG is repeated, when a result of applying "modulo 3" to the length value of the L-SIG is detected as "0", the RX PPDU may be determined as the non-HT, HT, and VHT PPDU.

In the following example, a signal represented as a (TX/RX/UL/DL) signal, a (TX/RX/UL/DL) frame, a (TX/RX/UL/DL) packet, a (TX/RX/UL/DL) data unit, (TX/RX/UL/DL) data, or the like may be a signal transmitted/received based on the PPDU of FIG. 10. The PPDU of FIG. 10 may be used to transmit/receive frames of various types. For example, the PPDU of FIG. 10 may be used for a control frame. An example of the control frame may include a request to send (RTS), a clear to send (CTS), a power save-poll (PS-poll), BlockACKReq, BlockAck, a null data packet (NDP) announcement, and a trigger frame. For example, the PPDU of FIG. 10 may be used for a management frame. An example of the management frame may include a beacon frame, a (re-)association request frame, a (re-)association response frame, a probe request frame, and a probe response frame. For example, the PPDU of FIG. 10 may be used for a data frame. For example, the PPDU of FIG. 10 may be used to simultaneously transmit at least two or more of the control frames, the management frame, and the data frame.

Figure 11:
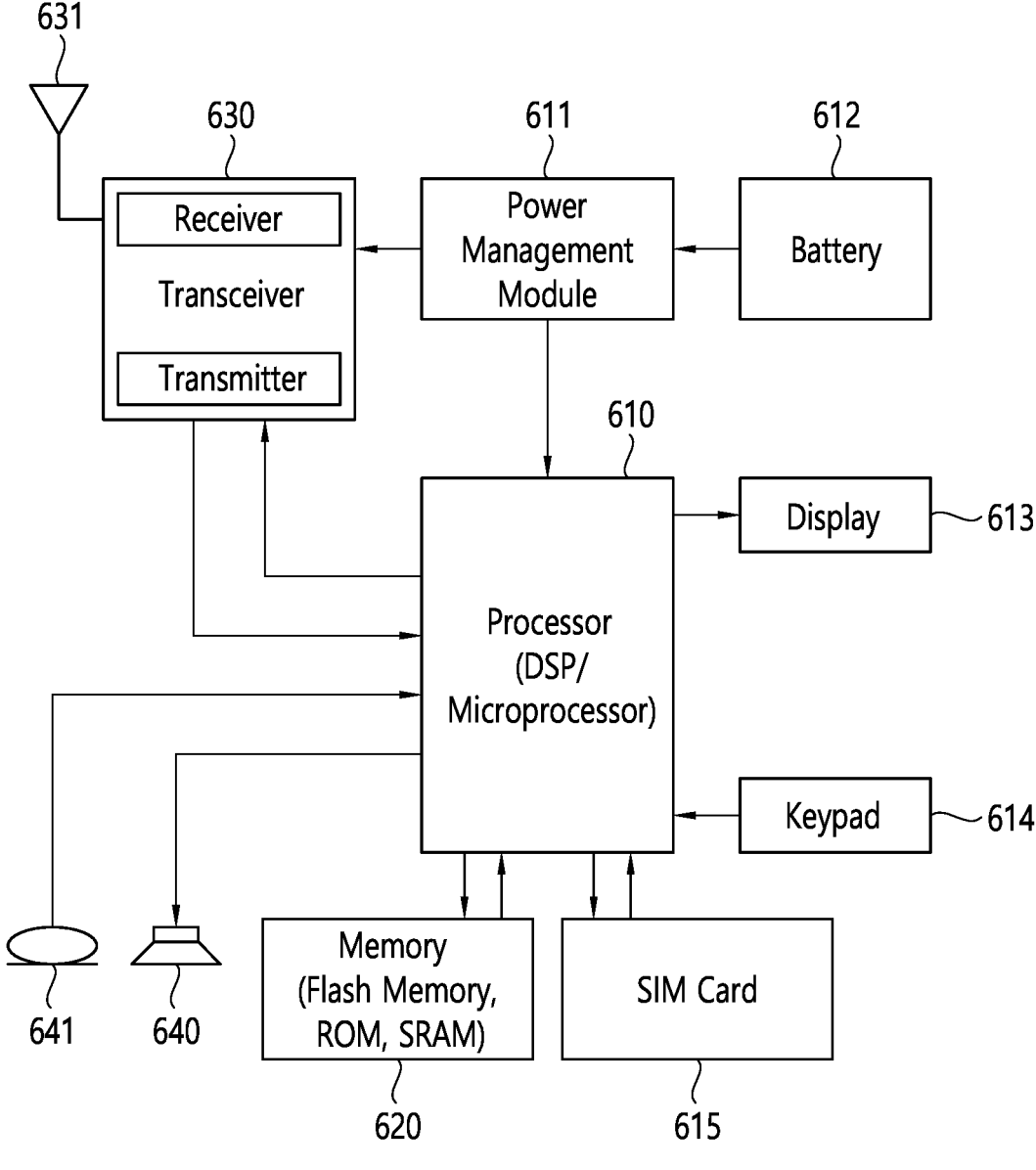
FIG. 11 illustrates an example of a modified transmission device and/or receiving device of the present specification.

FIG. 11 illustrates an example of a modified transmission device and/or receiving device of the present specification.

Each device/STA of the sub-figure (a)/(b) of FIG. 1 may be modified as shown in FIG. 11. A transceiver 630 of FIG. 11 may be identical to the transceivers 113 and 123 of FIG. 1. The transceiver 630 of FIG. 11 may include a receiver and a transmitter.

A processor 610 of FIG. 11 may be identical to the processors 111 and 121 of FIG. 1. Alternatively, the processor 610 of FIG. 11 may be identical to the processing chips 114 and 124 of FIG. 1.

A memory 620 of FIG. 11 may be identical to the memories 112 and 122 of FIG. 1. Alternatively, the memory 620 of FIG. 11 may be a separate external memory different from the memories 112 and 122 of FIG. 1.

Referring to FIG. 11, a power management module 611 manages power for the processor 610 and/or the transceiver 630. A battery 612 supplies power to the power management module 611. A display 613 outputs a result processed by the processor 610. A keypad 614 receives inputs to be used by the processor 610. The keypad 614 may be displayed on the display 613. A SIM card 615 may be an integrated circuit which is used to securely store an international mobile subscriber identity (IMSI) and its related key, which are used to identify and authenticate subscribers on mobile telephony devices such as mobile phones and computers.

Referring to FIG. 11, a speaker 640 may output a result related to a sound processed by the processor 610. A microphone 641 may receive an input related to a sound to be used by the processor 610.

Hereinafter, a trigger frame will be described.

Figure 12:
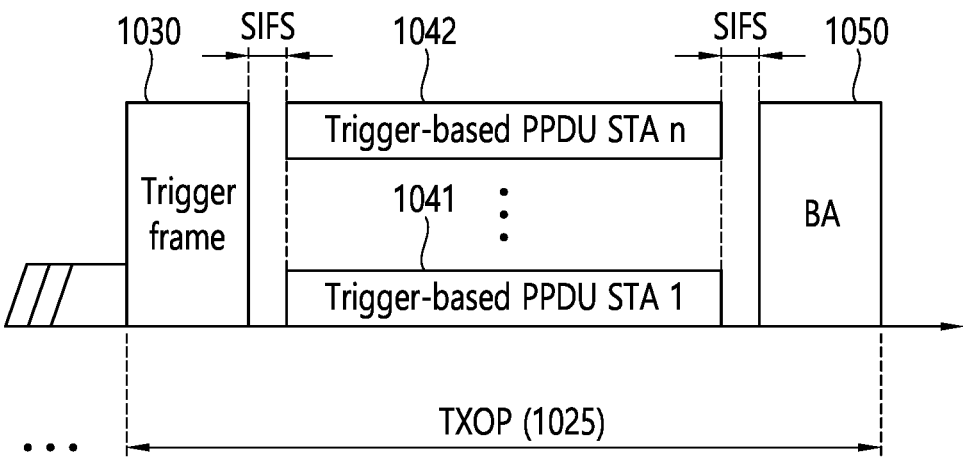
FIG. 12 shows an operation according to UL-MU.

FIG. 12 shows an operation according to UL-MU.

As shown in FIG. 12, a transmitting STA (e.g., an AP) may perform channel access through contending (i.e., a backoff operation) and transmit a trigger frame 1030. That is, the transmitting STA (e.g., AP) may transmit the PPDU including the trigger frame 1030. When a PPDU including a trigger frame is received, a trigger-based (TB) PPDU is transmitted after a delay which is set to a Short Interframe Space (SIFS).

The TB PPDUs 1041 and 1042 may be transmitted at the overlapped time durations/periods and transmitted from a plurality of STAs (e.g., user STAs) for which association identifiers (AIDs) are indicated in the trigger frame 1030. The ACK frame 1050 for the TB PPDU may be implemented in various forms.

Specific characteristics of the trigger frame are described with reference to FIGS. 13 to 16. Even when UL-MU communication is used, an orthogonal frequency division multiple access (OFDMA) technique or a MU MIMO technique may be used, and OFDMA and MU MIMO techniques may be used simultaneously.

FIG. 13 shows an example of a common information field of a trigger frame. FIG. 14 shows another example of a common information field of a trigger frame.

FIG. 13 shows the HE variant of the common information field, and FIG. 14 shows the EHT variant of the common information field. That is, the trigger frame may include a common information field corresponding to the HE variant and/or a common information field corresponding to the EHT variant.

Figure 15:
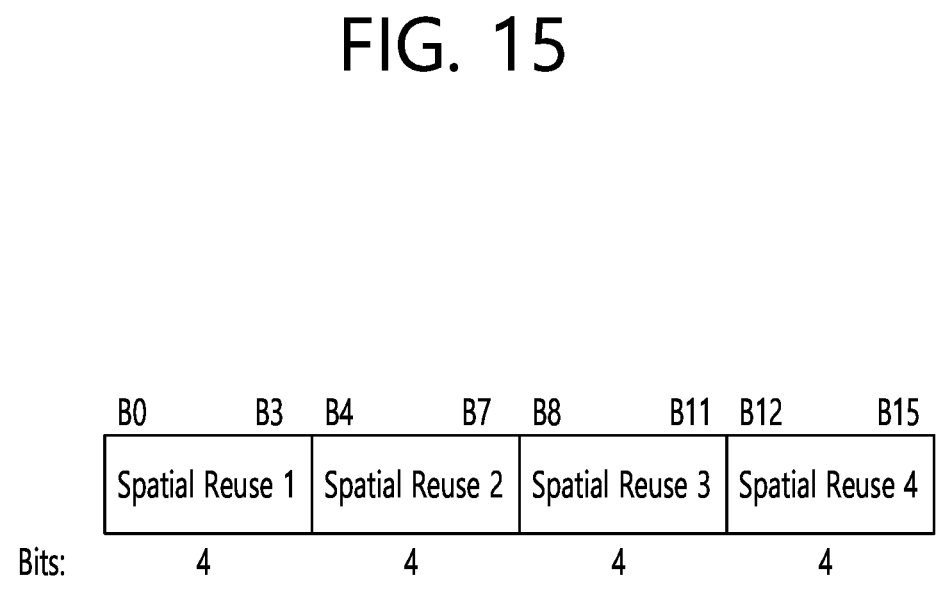

FIG. 15 shows a format of a UL Spatial Reuse subfield.

Referring to FIG. 13 and FIG. 14, when the trigger frame requests the HE TB PPDU, the UL Spatial Reuse subfield of the common information field delivers a value to be included in the Spatial Reuse field in the HE-SIG-A field of the requested HE TB PPDU. In the UL Spatial Reuse subfield, each Spatial Reuse n subfield ($1 \le n \le 4$) is set to the same value as the corresponding subfield in the HE-SIG-A field of the HE TB PPDU. Spatial Reuse 1, Spatial Reuse 2, Spatial Reuse 3, and Spatial Reuse 4 fields included in the HE-SIG-A field of the HE TB PPDU are defined as follows. Each Spatial Reuse field consists of 4 bits.

Each Spatial Reuse field included in the HE-SIG-A field of the HE TB PPDU indicates whether a specific spatial reuse mode is allowed in the subband of the PPDU while the PPDU is being transmitted. If PSR reuse is allowed, PSRT (Parameterized Spatial Reuse) Reuse Transmission) indicates a value used to determine the limit on the transmit power of the PPDU.

First, if the Bandwidth field indicates 20 MHz, 40 MHz or 80 MHz, the Spatial Reuse 1 field is applied to the first 20 MHz subband. If the bandwidth field indicates 160/80+80 MHz, the Spatial Reuse 1 field is applied to the first 40 MHz subband of the 160 MHz operating band. The Spatial Reuse 1 field is set to one of the Spatial Reuse field encoding values for the HE TB PPDU as shown in Table 3 below. The Spatial Reuse 1 field refers to the first value in the TXVECTOR parameter SPATIAL_REUSE when present.

Second, if the bandwidth field indicates 40 MHz or 80 MHz, the Spatial Reuse 2 field is applied to the second 20 MHz subband. If the channel width in which the STA operates is 20 MHz, the Spatial Reuse 2 field is set to the same value as the Spatial Reuse 1 field. If the channel width in which the STA operates is 40 MHz in the 2.4 GHz band, the Spatial Reuse 2 field is set to the same value as the Spatial Reuse 1 field. If the bandwidth field indicates 160/80+80 MHz, the Spatial Reuse 2 field is applied to the second 40 MHz subband of the 160 MHz operating band. The Spatial Reuse 2 field is set to one of the Spatial Reuse field encoding values for the HE TB PPDU as shown in Table 3 below. The Spatial Reuse 2 field refers to the second value in the TXVECTOR parameter SPATIAL_REUSE when present.

Thirdly, if the bandwidth field indicates 80 MHz, the Spatial Reuse 3 field is applied to the third 20 MHz subband. If the channel width in which the STA operates is 20 MHz or 40 MHz, the Spatial Reuse 3 field is set to the same value as the Spatial Reuse 1 field. If the bandwidth field indicates 160/80+80 MHz, the Spatial Reuse 3 field is applied to the third 40 MHz subband of the 160 MHz operating band. If the channel width in which the STA operates is 80+80 MHz, the Spatial Reuse 3 field is set to the same value as the Spatial Reuse 1 field. The Spatial Reuse 3 field is set to one of the Spatial Reuse field encoding values for the HE TB PPDU as shown in Table 3 below. The Spatial Reuse 3 field refers to the third value in the TXVECTOR parameter SPATIAL_REUSE when present.

Fourth, if the bandwidth field indicates 80 MHz, the Spatial Reuse 4 field is applied to the fourth 20 MHz subband. If the channel width in which the STA operates is 20 MHz, the Spatial Reuse 4 field is set to the same value as the Spatial Reuse 1 field. If the channel width in which the STA operates is 40 MHz, the Spatial Reuse 4 field is set to the same value as the Spatial Reuse 2 field. If the bandwidth field indicates 160/80+80 MHz, the Spatial Reuse 4 field is applied to the fourth 40 MHz subband of the 160 MHz operating band. If the channel width in which the STA operates is 80+80 MHz, the Spatial Reuse 4 field is set to the same value as the Spatial Reuse 2 field. The Spatial Reuse 4 field is set to one of the Spatial Reuse field encoding values for the HE TB PPDU as shown in Table 3 below. The Spatial Reuse 4 field refers to the fourth value in the TXVECTOR parameter SPATIAL_REUSE when present.

TABLE 3

| Value | Meaning |
| --- | --- |
| 0 | PSR_DISALLOW |
| 1 | PSR = −80 dBm |
| 2 | PSR = −74 dBm |
| 3 | PSR = −68 dBm |
| 4 | PSR = −62 dBm |
| 5 | PSR = −56 dBm |
| 6 | PSR = −50 dBm |
| 7 | PSR = −47 dBm |
| 8 | PSR = −44 dBm |
| 9 | PSR = −41 dBm |
| 10 | PSR = −38 dBm |
| 11 | PSR = −35 dBm |
| 12 | PSR = −32 dBm |
| 13 | PSR = −29 dBm |
| 14 | PSR ≥ −26 dBm |
| 15 | PSR_AND_NON_SRG_OBSS_PD_PROHIBITED |

The four Spatial Reuse 1, 2, 3, and 4 fields are arranged in order of frequency as follows.

In the case of 20 MHz, one Spatial Reuse field corresponds to the entire 20 MHz (the other three Spatial Reuse fields indicate the same value). The Spatial Reuse field applies only to the 20 MHz used for transmission.

In the case of 40 MHz, there are two Spatial Reuse fields including a Spatial Reuse 3 field having the same value as the Spatial Reuse 1 field and a Spatial Reuse 4 field having the same value as the Spatial Reuse 2 field. Each pair of Spatial Reuse fields applies only to the corresponding 20 MHz used for transmission.

In the case of 80 MHz, there are four Spatial Reuse fields, one for each 20 MHz subchannel.

In the case of OFDMA transmission of a given BW, each Spatial Reuse field corresponding to a 20 MHz subband is also applicable to the 242-tone RUs aligned closest to the frequency of the 20 MHz subband described above (in the tone plan for that BW). The correspondence from Spatial Reuse field to 242-tone RU is also applied to all RUs within 242-tone RU. The above also implies: the 20 MHz OBSS STA uses the Spatial Reuse field corresponding to its 20 MHz channel; the 40 MHz OBSS STA located in the lower half of the 80 MHz BSS uses the values of the Spatial Reuse 1 field and the Spatial Reuse 2 field; and the upper half of the 80 MHz BSS The 40 MHz OBSS STA located in uses the Spatial Reuse 3 field and Spatial Reuse 4 field values.

For 160 MHz and 80+80 MHz, there are four Spatial Reuse fields, one per 40 MHz subchannel.

In the case of OFDMA transmission of a given BW, each Spatial Reuse field corresponding to a 40 MHz subband can also be applied to the 484-tone RU aligned closest to the frequency of the 40 MHz subband described above. The correspondence from Spatial Reuse field to 484-tone RU is also applied to all RUs within the 484-tone RU.

The table below shows an example of encoding a Spatial Reuse field for HE SU PPDU, HE ER SU PPDU, and HE MU PPDU.

TABLE 4

| Value | Meaning |
| --- | --- |
| 0 | PSR_DISALLOW |
| 1-12 | Reserved |
| 13 | SR_RESTRICTED |
| 14 | SR_DELAYED |
| 15 | PSR_AND_NON_SRG_OBSS_PD_PROHIBITED |

Returning to FIG. 15, when the trigger frame requests the EHT TB PPDU, each Spatial Reuse n subfield (1≤n≤4) of the Common Info field is determined based on either the Spatial Reuse 1 subfield or the Spatial Reuse 2 subfield of the Special User Info field.

FIG. 16 shows an example of a format of a Special User Info field.

If the Special User Info field is included in the trigger frame, the Special User Information field Present subfield of the EHT variant of the Common Information field is set to 0, otherwise it is set to 1.

The Special User Info field is identified by an AID12 value of 2007 and is optionally present in a trigger frame generated by the EHT AP.

The Special User Info field, if present, is located immediately after the Common Info field of the trigger frame, carries the non-derived subfield of the U-SIG field of the requested EHT TB PPDU, and the Special User Information field of the Common Info field Present Subfield is set to 0.

The existence of the Special User Info field in the trigger frame is indicated by B55 of the Common Info field in the trigger frame. The B55 is set to 1 to indicate that there is no Special User Info field in the trigger frame, and is set to 0 to indicate that the Special User Info field exists in the trigger frame right after the Common Info field.

The Spatial Reuse n subfield (1≤n≤2) of FIG. 16 is set to the same value as the corresponding Spatial Reuse subfield in the U-SIG field of the EHT TB PPDU. Spatial Reuse 1 and Spatial Reuse 2 fields included in the U-SIG field of the EHT TB PPDU are defined as follows. Each Spatial Reuse field consists of 4 bits.

Each Spatial Reuse field included in the U-SIG field of the EHT TB PPDU indicates whether a specific spatial reuse mode is allowed in a subband of the PPDU while the PPDU is being transmitted, and indicates a value used to determine the transmission power limit of the PSRT PPDU when PSR reuse is allowed.

First, if the bandwidth field indicates 20 MHz or 40 MHz, the Spatial Reuse 1 field is applied to the first 20 MHz subband. If the bandwidth field indicates 80 MHz, the Spatial Reuse 1 field is applied to each 20 MHz subchannel of the first 40 MHz subband within the 80 MHz operating band. If the bandwidth field indicates 160 MHz, the Spatial Reuse 1 field is applied to each 20 MHz subchannel of the first 80 MHz subband within the 160 MHz operating band. If the bandwidth field indicates 320 MHz-1 or 320 MHz-2, the Spatial Reuse 1 field is applied to each 20 MHz subchannel of the first 160 MHz subband within the 320 MHz operating band.

The Spatial Reuse 1 field is set to the SPATIAL_REUSE (1) parameter of TXVECTOR including the Spatial Reuse field encoding value for the HE TB PPDU as shown in Table 3 above.

Second, if the bandwidth field indicates 20 MHz, the Spatial Reuse 2 field is set to the same value as the Spatial Reuse 1 field, and disregarded if dot11EHTBaseLineFeaturesImplementedOnly is true. If the bandwidth field indicates 40 MHz, the Spatial Reuse 2 field is applied to the second 20 MHz subband. When operating in the 2.4 GHz band, the Spatial Reuse 2 field is set to the same value as the Spatial Reuse 1 field. If the bandwidth field indicates 80 MHz, the Spatial Reuse 2 field is applied to each 20 MHz subchannel of the second 40 MHz subband within the 80 MHz operating band. If the bandwidth field indicates 160 MHz, the Spatial Reuse 2 field is applied to each 20 MHz subchannel of the second 80 MHz subband within the 160 MHz operating band. If the bandwidth field indicates 320 MHz-1 or 320 MHz-2, the Spatial Reuse 2 field is applied to each 20 MHz subchannel of the second 160 MHz subband within the 320 MHz operating band.

The Spatial Reuse 2 field is set to the SPATIAL_REUSE (2) parameter of TXVECTOR including the Spatial Reuse field encoding value for the HE TB PPDU as shown in Table 3 above.

Hereinafter, the methods proposed in the present specification are described.

The introduction of Aggregated (A)-PPDU in a next-generation WLAN system is discussed. An A-PPDU may mean a PPDU in which several PPDUs are aggregated. For example, when an A-PPDU includes a first PPDU and a second PPDU, the first PPDU and the second PPDU may be transmitted in an overlapping time periods/resource. At this time, the A-PPDU may be transmitted by one STA. Alternatively, the first PPDU constituting the A-PPDU may be transmitted by a first STA, and the second PPDU constituting the A-PPDU may be transmitted by a second STA.

For example, when a trigger frame transmitted by a transmitting STA is transmitted to a plurality of receiving STAs, the plurality of receiving STAs may be STAs supporting the same standard or support different standards. For example, for receiving STA1 and receiving STA2 receiving the trigger frame, the receiving STA1 may be a HE STA and the receiving STA2 may be an EHT STA. At this time, the receiving STA1 and the receiving STA2 may transmit a trigger-based (TB) A-PPDU to the transmitting STA after receiving the trigger frame. Here, a method of configuring a trigger frame for the receiving STA1 and the receiving STA2 supporting different standards to transmit a TB A-PPDU is required.

The present specification proposes a structure of an enhanced trigger frame in which HE STAs and EHT STAs can be triggered based on one trigger frame. That is, a method in which both HE STAs and EHT STAs (or STAs supporting later versions of WIFI standard, hereinafter referred to as 'EHT+' STAs) can be triggered by one improved trigger frame is proposed.

Since the HE STA does not know where the enhanced trigger frame is changed, the enhanced trigger frame may be configured to be backward compatible. Accordingly, the reserved one bit (e.g., B63) of the Common Information field may be changed as shown in the following table. The bit may be used by the EHT STA to extend the bandwidth (BW).

TABLE 5

| | HE STA | EHT STA |
|---|---|---|
| B63 = 0 | Not considered (operates based on the uplink bandwidth (UL BW) subfields of B18-19) | Operates based on the uplink bandwidth (UL BW) subfields of B18 to 19 |
| B63 = 1 | | Operates at 320 MHz BW |

Except for the case where the reserved 1 bit indicates a 320 MHz bandwidth, HE STA, EHT STA, and 'EHT+' STA may be allocated the same bandwidth regardless of operation bandwidth through an improved trigger frame. Accordingly, the STA may obtain information about its own transmission bandwidth and RU through the RU allocation subfield included in the user information field of the trigger frame. Here, the HE STA may determine the transmission bandwidth according to the UL uplink bandwidth (BW) subfield, and the EHT STA may determine the transmission bandwidth according to the UL BW subfield except when 320 MHz is indicated.

Alternatively, B18 to 19 may be used as UL BW subfields only for HE STAs, and B63 may be used to inform that there is an EHT STA (or EHT+STA). At this time, as described later, a UL BW subfield for EHT STA (or EHT+STA) may be separately set.

(Method 1) Method using bits from B54 to B62 (9 bits are available): According to the 802.11ax standard, B54 to B62 are all set to 1, the HE STA may use these values as reserved bits of HE-SIG-A2. The bits B54 to B62 may be used for UL BW indication of the EHT STA (or 'EHT+' STA).

(Method 2) When the STA ID of the user information field is set to a specific value (e.g., when set to one of the reserved values for HE STA), the bits of the corresponding user field are EHT STA (or 'EHT+' STA) may be used to indicate the UL BW. At this time, 27 bits may be used except for an association identifier (AID) and reserved bits.

Based on the methods described above, some of the available bits may be used as UL BW subfields for an uplink TB trigger-based PPDU (PPDU) of an EHT STA (or 'EHT+' STA). For example, the UL BW subfield may be set to 3 bits. In this case, the UL BW subfield may indicate 20 MHz/40 MHz/80 MHz/160 MHz/320 MHz bandwidth.

When an improved trigger frame is defined based on the above-described methods, HE TB PPDUs and EHT (or EHT+) TB PPDUs may coexist within a specific time domain. At this time, the HE TB PPDU is allocated in the same way as the existing 802.11ax trigger frame, and the EHT (or EHT+) TB PPDU may be allocated to the remaining resource to which the HE TB PPDU is not allocated. For example, when the UL BW subfield for the HE STA indicates an 80 MHz bandwidth and the UL BW subfield for the EHT (or EHT+) STA indicates a 320 MHz bandwidth, the HE STA may transmit a HE UL TB PPDU through an 80 MHz bandwidth like the operation in the existing 802.11ax standard. In addition, the EHT (or EHT +) STA may transmit the EHT (or EHT+) UL TB PPDU through the remaining bandwidth (in this case, the 240 MHz bandwidth minus the 80 MHz bandwidth allocated for the HE STA in the 320 MHz bandwidth) or RU in this case, RUs within 320 MHz excluding RUs allocated for HE STA) except for the resource allocated to the HE STA within the 320 MHz bandwidth. The bandwidth or RU allocation may be performed based on the RU allocation subfield of the user information field.

However, the configuration of the 80 MHz segment for the HE STA is different from the configuration of the 80 MHz segment for the EHT STA. Accordingly, the following rules may be required to coexist HE TB PPDUs and EHT (or EHT+) TB PPDUs in one same time period/duration.

For example, when the bandwidth is 80 MHz or more, the RU or small MRU allocated to the HE STA and the RU or small MRU allocated to the EHT STA may not coexist within the same 20 MHz bandwidth. For example, if both the UL BW of the HE STA and the UL BW of the EHT STA are 80 MHz, subcarrier indices of 26/52/106-tone RUs for the second/third 20 MHz bandwidths among the first/second/third/fourth 20 MHz bandwidths may be different from each other. Therefore, when RUs in different 20 MHz regions or small MRUs are allocated to HE STAs and EHT STAs, collision of subcarrier indices can be prevented.

Figure 17:
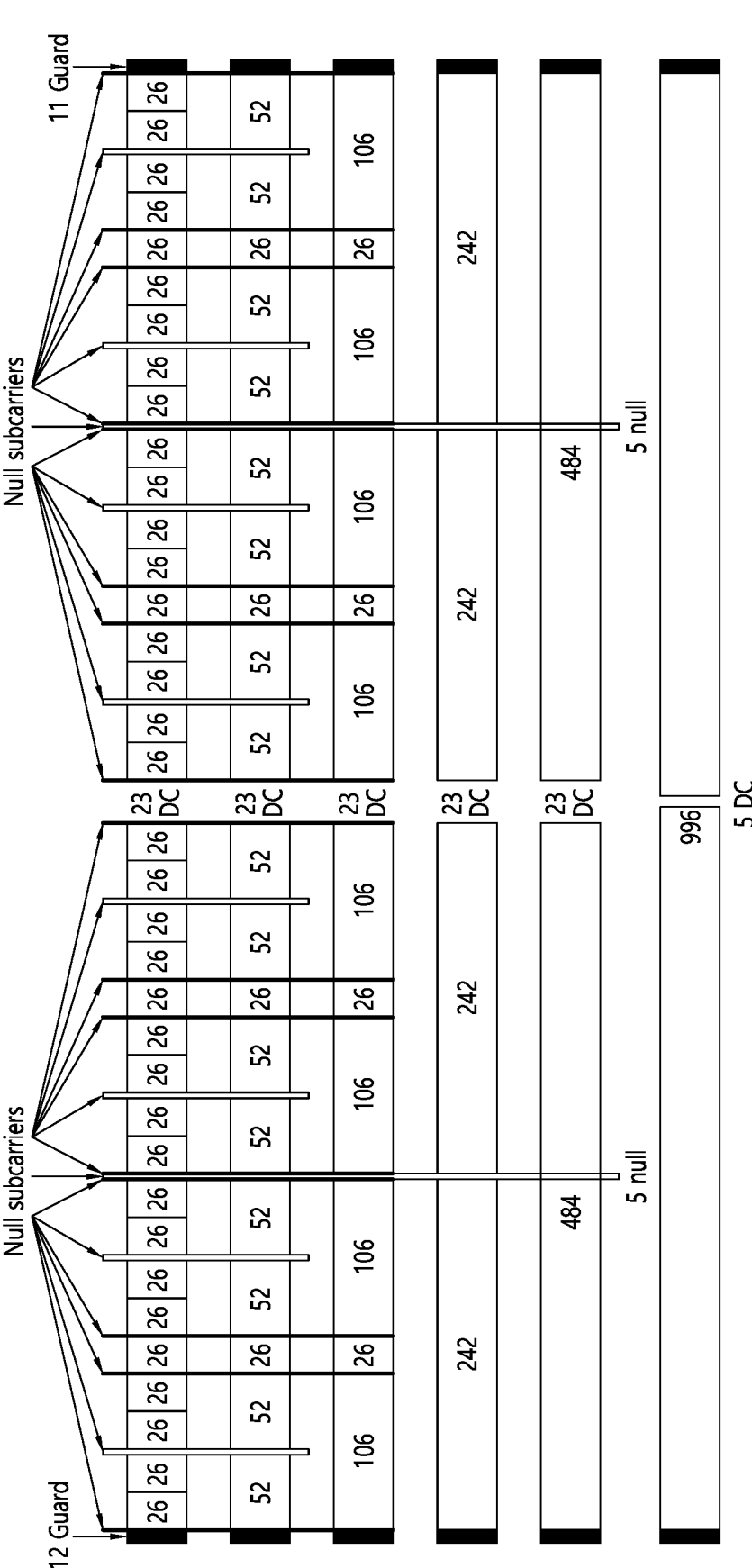
FIG. 17 is a diagram showing the arrangement/location of resource units (RUs) used on the 80 MHz band.

FIG. 17 is a diagram showing the arrangement/location of resource units (RUs) used on the 80 MHz band.

The arrangement/location of resource units (RUs) used in the present specification may be variously changed. For example, the arrangement/location of resource units (RUs) used on the 80 MHz band may be variously changed. For example, the arrangement/location of resource units (RUs) used on the 80 MHz band may be configured based on FIG. 17 rather than FIG. 7.

The tone-plan for 160/240/320 MHz may be configured in the form of repeating the pattern of FIG. 17 several times.

Here, referring to FIGS. 7 and 17, the RU index and subcarrier range for the arrangement of resource units in FIG. 7 may be different from the RU index and subcarrier range for the arrangement of resource units in FIG. 17. As an example, the arrangement/location of resource units in FIG. 7 may be applied to HE STAs as shown in Table 6 below. In addition, the arrangement/location of resource units of FIG. 17 may be applied to EHT STAs as shown in Table 7 below. In this case, RU10 to RU28 of the 26-tone RU, RU5 to RU12 of the 52-tone RU, and RU3 to RU6 of the 106-tone RU may be defined differently for the HE STA and the EHT STA. Therefore, as described above, due to different RU indexes and/or subcarrier ranges, the RU or small MRU allocated to the HE STA and the RU or small MRU allocated to the EHT STA may not be allocated to the same 20 MHz bandwidth.

TABLE 6

| RU type | RU index and subcarrier range | | | | |
|---|---|---|---|---|---|
| 26-tone RU | RU 1 | RU 2 | RU 3 | RU 4 | RU 5 |
| | [−499: −474] | [−473: −448] | [−445: −420] | [−419: −394] | [−392: −367] |
| | RU 6 | RU 7 | RU 8 | RU 9 | |
| | [−365: −340] | [−339: −314] | [−311: −286] | [−285: −260] | |
| | RU 10 | RU 11 | RU 12 | RU 13 | RU 14 |
| | [−257: −232] | [−231: −206] | [−203: −178] | [−177: −152] | [−150: −125] |
| | RU 15 | RU 16 | RU 17 | RU 18 | RU 19 |
| | [−123: −98] | [−97: −72] | [−69: −44] | [−43: −18] | [−16: −4, 4: 16] |
| | RU 20 | RU 21 | RU 22 | RU 23 | RU 24 |
| | [18: 43] | [44: 69] | [72: 97] | [98: 123] | [125: 150] |
| | RU 25 | RU 26 | RU 27 | RU28 | |
| | [152: 177] | [178: 203] | [206: 231] | [232: 257] | |
| | RU 29 | RU 30 | RU 31 | RU 32 | RU 33 |
| | [260: 285] | [286: 311] | [314: 339] | [340: 365] | [367: 392] |
| | RU 34 | RU 35 | RU 36 | RU37 | |
| | [394: 419] | [420: 445] | [448: 473] | [474: 499] | |
| 52-tone RU | RU 1 | RU 2 | RU 3 | RU 4 | |
| | [−499: −448] | [−445: −394] | [−365: −314] | [−311: −260] | |
| | RU 5 | RU 6 | RU 7 | RU 8 | |
| | [−257: −206] | [−203: −152] | [−123: −72] | [−69: −18] | |
| | RU 9 | RU 10 | RU 11 | RU 12 | |
| | [18: 69] | [72: 123] | [152: 203] | [206: 257] | |
| | RU 13 | RU 14 | RU 15 | RU 16 | |
| | [260: 311] | [314: 365] | [394: 445] | [448: 499] | |
| 106-tone RU | RU 1 | RU 2 | RU 3 | RU 4 | |
| | [−499: −394] | [−365: −260] | [−257: −152] | [−123: −18] | |
| | RU 5 | RU 6 | RU 7 | RU 8 | |
| | [18: 123] | [152: 257] | [260: 365] | [394: 499] | |
| 242-tone RU | RU 1 | RU 2 | RU 3 | RU 4 | |
| | [−500: −259] | [−258: −17] | [17: 258] | [259: 500] | |
| 484-tone RU | RU 1 | | RU 2 | | |
| | [−500: −17] | | [17: 500] | | |
| 996-tone RU | | RU 1 | | | |
| | | [−500: −3, 3: 500] | | | |

The subcarrier index of 0 corresponds to the DC tone. Negative subcarrier indices correspond to subcarries with frequency lower than the DC tone, and positive subcarrier indices correspond to subcarriers with frequency higher than the DC tone.
RU 19 is the center 26-tone RU.

TABLE 7

| RU type | RU index and subcarrier range | | | | |
|---|---|---|---|---|---|
| 26-tone RU | RU 1 | RU 2 | RU 3 | RU 4 | RU 5 |
| | [−499: −474] | [−473: −448] | [−445: −420] | [−419: −394] | [−392: −367] |
| | RU 6 | RU 7 | RU 8 | RU 9 | |
| | [−365: −340] | [−339: −314] | [−311: −286] | [−285: −260] | |
| | RU 10 | RU 11 | RU 12 | RU 13 | RU 14 |
| | [−252: −227] | [−226: −201] | [−198: −173] | [−172: −147] | [−145: −120] |
| | RU 15 | RU 16 | RU 17 | RU 18 | RU 19 |
| | [−118: −93] | [−92: −67] | [−64: −39] | [−38: −13] | [not defined] |
| | RU 20 | RU: 21 | RU 22 | RU 23 | RU 24 |
| | [13: 38] | [39: 64] | [67: 92] | [93: 118] | [120: 145] |
| | RU 25 | RU 26 | RU 27 | RU 28 | |
| | [147: 172] | [173: 198] | [201: 226] | [227: 252] | |

TABLE 7-continued

| RU type | RU index and subcarrier range | | | | |
|---|---|---|---|---|---|
| | RU 29 | RU 30 | RU 31 | RU 32 | RU 33 |
| | [260: 285] | [286: 311] | [314: 339] | [340: 365] | [367: 392] |
| | RU 34 | RU 35 | RU 36 | RU 37 | |
| | [394: 419] | [420: 445] | [448: 473] | [474: 499] | |
| 52-tone RU | RU 1 | RU 2 | RU3 | RU 4 | |
| | [−499: −448] | [−445: −394] | [−365: −314] | [−311: −260] | |
| | RU 5 | RU 6 | RU 7 | RU 8 | |
| | [−252: −201] | [−198: −147] | [−118: −67] | [−64: −13] | |
| | RU 9 | RU 10 | RU 11 | RU 12 | |
| | [13: 64] | [67: 118] | [147: 198] | [201: 252] | |
| | RU 13 | RU 14 | RU 15 | RU 16 | |
| | [260: 311] | [314: 365] | [394: 445] | [448: 499] | |
| 106-tone RU | RU 1 | RU 2 | RU 3 | RU 4 | |
| | [−499: −394] | [−365: −260] | [−252: −147] | [−118: −13] | |
| | RU 5 | RU 6 | RU 7 | RU 8 | |
| | [13: 118] | [147: 252] | [260: 365] | [394: 499] | |
| 242-tone RU | RU 1 | RU 2 | RU 3 | RU 4 | |
| | [−500: −259] | [−253: −12] | [12: 253] | [259: 500] | |
| 484-tone RU | RU 1 | RU 2 | | | |
| | [−500: −239, | [12: 253, | | | |
| | −253: −12] | 259: 500] | | | |
| 996-tone RU | RU 1 | | | | |
| | [−500: −3, | | | | |
| | 3: 500] | | | | |

Meanwhile, in the present specification, a small MRU may mean a small size multiple RU (MRU). Here, the small-sized MRU may be an MRU having fewer than 242 tones. For example, the small size MRU may include a 52+26-tone MRU and a 106+26-tone MRU.

In addition, available bits may inform the following information. As an example, the available bits may be used as a PHY version field for a UL TB PPDU of an EHT STA (or 'EHT+' STA). Here, for example, the PHY version field may consist of 3 bits.

As another example, the available bits may inform a puncturing channel indication for the UL TB PPDU of the EHT STA (or 'EHT+' STA).

Meanwhile, the HE STA may use an existing user information field. In addition, the EHT STA (or 'EHT+' STA) may use a newly configured user information field as will be described later. Hereinafter, examples of methods of interpreting the newly configured user information field will be described.

(Example 1) Reserved bit (B39): If this bit indicates '0', the corresponding user information field may be a user information field for the HE STA. In addition, if this bit indicates '1', the corresponding user information field may be a user information field for EHT STA (or 'EHT+' STA).

(Example 2) When the B39 indicates '1', the newly configured user information field may be configured differently from the 802.11ax user information field. For example, the following subfields may be included.

(Subfield A) Version indication: A subfield indicating whether the newly configured user information field is an EHT standard field or an 'EHT+' standard field may be configured in the newly configured user information field.

(Subfield B) A new RU allocation subfield different from the 802.11ax standard: For example, the 1-bit subfield for indicating whether to use DCM (dual carrier modulation) is not used in the 802.11be standard, so a 9-bit RU allocation subfield including 1 bit for indicating whether the existing DCM is used and the existing RU allocation subfield may be configured in the newly configured user information field.

(Subfield C) Based on the change in the maximum number of available streams to 16, a new spatial stream allocation subfield may be configured in the newly configured user information field.

The HE STA may transmit the HE UL TB PPDU after reading the common information field and the user information field as in the prior art. On the other hand, according to the present specification, after the EHT STA (or 'EHT+' STA) separately reads the EHT (or EHT+) UL BW subfield in the common information field, information for the EHT STA (or 'EHT+' STA) through B39 of the user information field, if it is confirmed that the information is for the EHT STA (or 'EHT+' STA) through B39 of the user information field, the EHT STA (or 'EHT+' STA) can operate according to the value set for the improved user information field.

As an example of the RU allocation method, all RUs and/or MRUs configured in the EHT standard may be indicated to the STA. However, when considering an aggregated-PPDU (A-PPDU), a new RU and/or MRU may be defined. For example, if the 20 MHz bandwidth is set to UL BW for the HE-STA and the 320 MHz bandwidth is set to UL BW for the EHT-STA, a resource of 3*996+484+242-tone RU excluding the 20 MHz bandwidth may be allocated to the EHT STA. At this time, the RU may be indicated to the EHT STA by the following two methods.

(Method 1) Implicit method: RU/MRUs other than the UL BW of the HE STA in the RU/MRU allocated/indicated by the RU allocation subfield may be allocated to the EHT STA. In this case, even if the HE STA uses only some of the UL BW regions/resources configured for the HE STA, the remaining regions/resources may not be allocated to the EHT STA.

(Method 2) Explicit method: A 3*996+484+242-tone MRU may be defined. As an example, a new MRU is defined as shown in the following table, and a 3*996+484+242-tone MRU may be indicated/allocated to the EHT STA and/or 'EHT+' STA based on the following table.

TABLE 8

| X0 | X1 | X8-X2 of RU allocation subfield | EHT UL BW field | RU size | RU index |
|---|---|---|---|---|---|
| 0 | 0 | 107 | 320 MHz | 3*996 + | MRU1 |
| 0 | 0 | 108 | | 484 + 242 | MRU2 |

TABLE 8-continued

| X0 | X1 | X8-X2 of RU allocation subfield | EHT UL BW field | RU size | RU index |
|---|---|---|---|---|---|
| 0 | 0 | 109 | | | MRU3 |
| 0 | 0 | 110 | | | MRU4 |
| 0 | 1 | 107 | | | MRU5 |
| 0 | 1 | 108 | | | MRU6 |
| 0 | 1 | 109 | | | MRU7 |
| 0 | 1 | 110 | | | MRU8 |
| 1 | 0 | 107 | | | MRU9 |
| 1 | 0 | 108 | | | MRU10 |
| 1 | 0 | 109 | | | MRU11 |
| 1 | 0 | 110 | | | MRU12 |
| 1 | 1 | 107 | | | MRU13 |
| 1 | 1 | 108 | | | MRU14 |
| 1 | 1 | 109 | | | MRU15 |
| 1 | 1 | 110 | | | MRU16 |

Referring to the above table, sixteen (16) 3*996+484+242-tone MRUs may be defined. Indexes of the 16 MRUs may be defined as MRU1 to MRU16. In addition, the newly configured user information field may include a 9-bit RU allocation subfield. Each bit constituting the RU allocation subfield may be referred to as X8, X7, X6, X5, X4, X3, X2, X1, and X0 in order. Here, for example, when X0=0, X1=1, and the bits of X8-X2 indicate '108' (i.e., X8=1, X7=1, X6=0, X5=1, X4=1, X3=0, X2=0, X1=1, X0=0), the uplink bandwidth of the EHT STA is 320 MHz, and the index of the allocated RU may be MRU6. However, the above-described method is just an example, and a 3*996+484+242-tone MRU may be allocated to the EHT STA and/or 'EHT+' STA based on the user information field including the RU association subfield.

Figure 18:
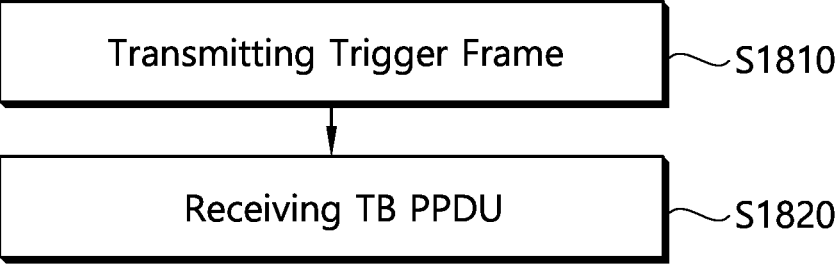
FIG. 18 is a flowchart of an example of a method used by a transmitting STA in a WLAN system.

Hereinafter, examples of a method used in a WLAN system according to some implementations of the present specification will be described. FIG. 18 is a flowchart of an example of a method used by a transmitting STA in a WLAN system.

Referring to FIG. 18, the transmitting STA transmits a trigger frame (S1810). Here, the trigger frame may include a common information field. Here, the common information field may include an uplink bandwidth subfield. The uplink bandwidth subfield may inform the first bandwidth of the first signal field of the first TB PPDU transmitted by the first receiving STA.

Also, the trigger frame may include at least one user information field. For example, the at least one user information field may include a first user information field for the first receiving STA and a second user information field for the second receiving STA.

In addition, a second bandwidth for a second signal field of a second TB PPDU transmitted by the second receiving STA may be determined based on the uplink bandwidth subfield and the at least one user information field. For example, the second bandwidth may be determined based on the uplink bandwidth subfield and the second user information field. Alternatively, the second bandwidth may be determined based on the uplink bandwidth subfield and the special user information field. The special user information field may be included in the at least one user information field.

Here, the second bandwidth may be indicated by the uplink bandwidth subfield and the at least one user information field (e.g., the second user information field, the special user information field, etc.). For example, when a TB PPDU is composed of a first TB PPDU transmitted by the first receiving STA and a second TB PPDU transmitted by the second receiving STA, and the TB PPDU is transmitted through a 320 MHz bandwidth. The first TB PPDU may be transmitted through a 20 MHz bandwidth, and the second TB PPDU may be transmitted through a 300 MHz bandwidth. In this case, the uplink bandwidth subfield may indicate the 20 MHz bandwidth, and the 300 MHz bandwidth may include the uplink bandwidth subfield and the at least one user information field (e.g., the second user information field or the special user information field).

For example, the second bandwidth may be indicated based on a combination of the uplink bandwidth subfield and the special user information field. Specifically, the second bandwidth may be indicated according to values indicated by the uplink bandwidth subfield and the special bandwidth subfield included in the special user information field.

Alternatively, the second bandwidth may be a remaining bandwidth excluding the first bandwidth from the third bandwidth indicated by the uplink bandwidth subfield and the at least one user information field (e.g., the second user information field, the special user information field, etc.). For example, when a TB PPDU is composed of a first TB PPDU transmitted by the first receiving STA and a second TB PPDU transmitted by the second receiving STA, and the TB PPDU is transmitted through a 320 MHz bandwidth, the first TB PPDU may be transmitted through a 20 MHz bandwidth, and the second TB PPDU may be transmitted through a 300 MHz bandwidth. In this case, the uplink bandwidth subfield may indicate the 20 MHz bandwidth, and the 320 MHz bandwidth may include the uplink bandwidth subfield and the at least one user information field (e.g., the second user information field or the special user information field). Here, the second receiving STA may transmit the second TB PPDU using a 300 MHz bandwidth excluding the 20 MHz bandwidth used by the first receiving STA in the 320 MHz bandwidth.

For example, the third bandwidth may be indicated based on a combination of the uplink bandwidth subfield and the special user information field. Specifically, the third bandwidth may be indicated according to values indicated by the uplink bandwidth subfield and the special bandwidth subfield included in the special user information field.

Here, as an example, when the first receiving STA is a HE STA and the second receiving STA is an EHT STA, the first signal field may be a HE-SIG-A field, and the second signal field may be a U-SIG field.

Here, the first user information field may include a first RU allocation subfield. Also, the second user information field may include a second RU allocation subfield. The first RU allocation subfield may inform a first RU for the first receiving STA. The second RU allocation subfield may inform a second RU for the second receiving STA. Here, the second RU may be one of a plurality of predefined RUs. In this case, 3*996+484+242-tone RUs may be included in the plurality of RUs defined in advance. Since the method for allocating the 3*996+484+242-tone RU is the same as described above based on Methods 1 and 2, duplicate descriptions will be omitted.

Thereafter, the transmitting STA receives a TB PPDU (S1820). Here, the TB PPDU may be an A-PPDU in which the first TB PPDU and the second TB PPDU are aggregated. Here, the first TB PPDU and the second TB PPDU may be transmitted on the same time domain resource.

Figure 19:
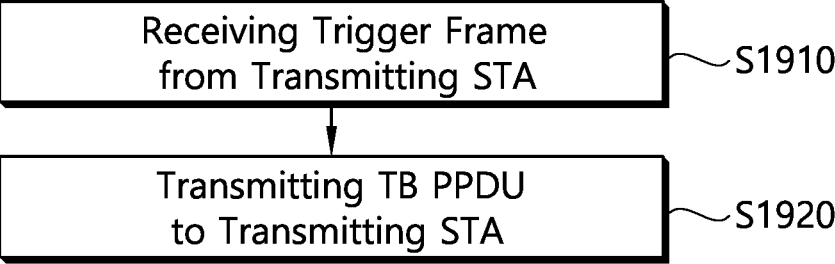
FIG. 19 is a flowchart of an example of a method used by a receiving STA in a WLAN system.

FIG. 19 is a flowchart of an example of a method used by a receiving STA in a WLAN system.

Referring to FIG. 19, the receiving STA receives a trigger frame from the transmitting STA (S1910). Here, the trigger frame may include a common information field. Here, the common information field may include an uplink bandwidth subfield.

Also, the trigger frame may include at least one user information field. For example, the trigger frame may include a user information field for the receiving STA. In addition, the bandwidth of the signal field of the TB PPDU transmitted by the receiving STA may be determined based on the uplink bandwidth subfield and the user information field. Alternatively, the bandwidth may be determined based on the uplink bandwidth subfield and the special user information field. The special user information field may be included in the at least one user information field. Here, as an example, when the receiving STA is an EHT STA, the signal field may be a U-SIG field.

For example, the TB PPDU may be transmitted through a 300 MHz bandwidth. In this case, the 300 MHz bandwidth may be indicated by the uplink bandwidth subfield and the at least one user information field (e.g., the second user information field or the special user information field).

Alternatively, the bandwidth may be a remaining bandwidth excluding a second bandwidth indicated by the uplink bandwidth subfield from the first bandwidth indicated by the uplink bandwidth subfield and the at least one user information field. For example, the uplink bandwidth subfield may indicate the 20 MHz bandwidth, and the 320 MHz bandwidth may include the uplink bandwidth subfield and the at least one user information field (e.g., the user information field or the special user information field). Here, the receiving STA may transmit the TB PPDU using a 300 MHz bandwidth excluding the 20 MHz bandwidth from the 320 MHz bandwidth.

Here, the user information field may include an RU allocation subfield. The RU allocation subfield may inform the RU for the receiving STA. Here, the RU may be one of a plurality of predefined RUs. In this case, 3*996+484+242-tone RUs may be included in the plurality of RUs defined in advance. Since the method for allocating the 3*996+484+242-tone RU is the same as described above based on Methods 1 and 2, duplicate descriptions will be omitted.

Thereafter, the receiving STA transmits a TB PPDU to the transmitting STA (S1920). Here, the TB PPDU may be transmitted by the receiving STA based on the RU and the bandwidth.

Meanwhile, in FIGS. 18 and 19, reference may be made to FIGS. 12 to 16 for the trigger frame structure, trigger frame, and TB PPDU-based operation. As an example, the structure of the trigger frame of FIGS. 18 and 19 may refer to FIGS. 13 to 16. In addition, the operation based on the trigger frame and TB PPDU of FIGS. 18 and 19 may refer to FIG. 12.

The technical features of the present specification described above may be applied to various devices and methods. For example, the technical features of the present specification described above may be performed/supported through the device of FIGS. 1 and/or 11. For example, the technical features of the present specification described above may be applied only to a part of FIGS. 1 and/or 11. For example, the technical features of the present specification described above are implemented based on the processing chips 114 and 124 of FIG. 1, or implemented based on the processors 111 and 121 and the memories 112 and 122 of FIG. 1, may be implemented based on the processor 610 and the memory 620 of FIG. 11.

Technical features of the present specification may be implemented based on a computer readable medium (CRM). For example, the CRM proposed by the present specification is at least one computer readable medium containing instructions based on being executed by at least one processor.

The CRM may store instructions that perform operations comprising: receiving a trigger frame from a transmitting STA, wherein the trigger frame includes a common information field and at least one user information field, wherein the common information field includes an uplink bandwidth subfield, wherein the uplink bandwidth subfield includes informs a first bandwidth, wherein the at least one user information field includes a special user information field and a user information field for the receiving STA, wherein the at least one user information field includes a Resource Unit (RU) allocation subfield, wherein the RU allocation subfield informs an RU for the receiving STA, and wherein the RU is one of a plurality of pre-defined RUs including 3*996+484+242-tone RUs; and transmitting a trigger-based (TB) physical protocol data unit (PPDU) to the transmitting STA, wherein a second bandwidth for a signal (SIG) field of the TB PPDU transmitted by the receiving STA is determined based on the uplink bandwidth subfield and the one or more user information fields. At least one processor related to the CRM of the present specification may be the processors 111 and 121 or the processing chips 114 and 124 of FIG. 1 or the processor 610 of FIG. 11. Meanwhile, the CRM of the present specification may be the memories 112 and 122 of FIG. 1, the memory 620 of FIG. 11, or a separate external memory/storage medium/disk.

The foregoing technical features of the present specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyperparameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

Claims disclosed in the present specification can be combined in various ways. For example, technical features in method claims of the present specification can be combined to be implemented or performed in an apparatus, and technical features in apparatus claims of the present specification can be combined to be implemented or performed in a method. Further, technical features in method claims and apparatus claims of the present specification can be combined to be implemented or performed in an apparatus. Further, technical features in method claims and apparatus claims of the present specification can be combined to be implemented or performed in a method.

What is claimed is:

1. A method in a Wireless Local Area Network (WLAN) system, the method comprising:

receiving, by first and second receiving stations (STAs), a trigger frame from a transmitting STA; and transmitting, by the first and second receiving STAs, a trigger-based (TB) aggregated-physical protocol data unit (A-PPDU) to the transmitting STA, wherein the TB A-PPDU is an aggregated PPDU of a first TB PPDU for the first receiving STA and a second TB PPDU for the second receiving STA, wherein the trigger frame includes first and second user information fields, wherein the first user information field includes a first Resource Unit (RU) allocation subfield including information on an RU for the first receiving STA, wherein the second user information field includes a second RU allocation subfield including information on an MRU for the second receiving STA, wherein the second RU allocation subfield consisting of 9 bits includes information on a number of 3×996+484+242-tone Multiple Resource Units (MRUs) and an allocation pattern of the 3×996+484+242-tone MRUs, wherein the number of the 3×996+484+242-tone MRUs is 16, and wherein the allocation pattern of the 3×996+484+242-tone MRUs is determined based on a puncturing position of a 242-tone RU.

2. The method of claim 1, wherein the trigger frame further includes a common information field, wherein the common information field includes an uplink bandwidth subfield including information on a first bandwidth of the first TB PPDU.

3. The method of claim 2, wherein the trigger frame further includes a special user information field, wherein the special user information field includes an uplink bandwidth extension subfield, and wherein a second bandwidth of the second TB PPDU is determined based on the uplink bandwidth subfield and the uplink bandwidth extension subfield.

4. The method of claim 3, wherein the second bandwidth is determined to be a 320 MHz bandwidth, wherein the 9 bits is {X8, X7, X6, X5, X4, X3, X2, X1, X0}, and wherein based on indexes of the 3×996+484+242-tone MRUs being MRU1 to MRU16:

X0=0, X1=0 and {X8, X7, . . . X2}=107 indicate MRU1,

X0=0, X1=0 and {X8, X7, . . . X2}=108 indicate MRU2,

X0=0, X1=0 and {X8, X7, . . . X2}=109 indicate MRU3,

X0=0, X1=0 and {X8, X7, . . . X2}=110 indicate MRU4,

X0=0, X1=1 and {X8, X7, . . . X2}=107 indicate MRU5,

X0=0, X1=1 and {X8, X7, . . . X2}=108 indicate MRU6,

X0=0, X1=1 and {X8, X7, . . . X2}=109 indicate MRU7,

X0=0, X1=1 and {X8, X7, . . . X2}=110 indicate MRU8,

X0=1, X1=0 and {X8, X7, . . . X2}=107 indicate MRU9,

X0=1, X1=0 and {X8, X7, . . . X2}=108 indicate MRU10,

X0=1, X1=0 and {X8, X7, . . . X2}=109 indicate MRU11,

X0=1, X1=0 and {X8, X7, . . . X2}=110 indicate MRU12,

X0=1, X1=1 and {X8, X7, . . . X2}=107 indicate MRU13,

X0=1, X1=1 and {X8, X7, . . . X2}=108 indicate MRU14,

X0=1, X1=1 and {X8, X7, . . . X2}=109 indicate MRU15, and

X0=1, X1=1 and {X8, X7, . . . X2}=110 indicate MRU16.

5. The method of claim 1, wherein the first TB PPDU is a high efficiency (HE) TB PPDU and the second TB PPDU is an extremely high throughput (EHT) TB PPDU.

6. The method of claim 1, wherein the first receiving STA is an HE STA and the second receiving STA is an EHT STA.

7. First and second receiving stations (STAs) in a Wireless Local Area Network (WLAN) system, comprising:

a memory;

a transceiver; and a processor operatively coupled to the memory and the transceiver, wherein the processor is adapted to:

receive a trigger frame from a transmitting STA, and transmit, a trigger-based (TB) aggregated-physical protocol data unit (A-PPDU) to the transmitting STA, wherein the TB A-PPDU is an aggregated PPDU of a first TB PPDU for the first receiving STA and a second TB PPDU for the second receiving STA, wherein the trigger frame includes first and second user information fields, wherein the first user information field includes a first Resource Unit (RU) allocation subfield including information on an RU for the first receiving STA, wherein the second user information field includes a second RU allocation subfield including information on an MRU for the second receiving STA, wherein the second RU allocation subfield consisting of 9 bits includes information on a number of 3×996+484+242-tone Multiple Resource Units (MRUs) and an allocation pattern of the 3×996+484+242-tone MRUs, wherein the number of the 3×996+484+242-tone MRUs is 16, and wherein the allocation pattern of the 3×996+484+242-tone MRUs is determined based on a puncturing position of a 242-tone RU.

8. A method in a Wireless Local Area Network (WLAN) system, the method comprising:

transmitting, by a transmitting station (STA), a trigger frame to first and second receiving STAs, and receiving, by the transmitting STA, a trigger-based (TB) aggregated-physical protocol data unit (A-PPDU) from the first and second receiving STAs, wherein the TB A-PPDU is an aggregated PPDU of a first TB PPDU for the first receiving STA and a second TB PPDU for the second receiving STA, wherein the trigger frame includes first and second user information fields, wherein the first user information field includes a first Resource Unit (RU) allocation subfield including information on an RU for the first receiving STA, wherein the second user information field includes a second RU allocation subfield including information on an MRU for the second receiving STA, and wherein the second RU allocation subfield consisting of 9 bits includes information on a number of 3×996+484+242-tone Multiple Resource Units (MRUs) and an allocation pattern of the 3×996+484+242-tone MRUs, wherein the number of the 3×996+484+242-tone MRUs is 16, and wherein the allocation pattern of the 3×996+484+242-tone MRUs is determined based on a puncturing position of a 242-tone RU.

9. The method of claim 8, wherein the trigger frame further includes a common information field, wherein the common information field includes an uplink bandwidth subfield including information on a first bandwidth of the first TB PPDU.

10. The method of claim 9, wherein the trigger frame further includes a special user information field, wherein the special user information field includes an uplink bandwidth extension subfield, and wherein a second bandwidth of the second TB PPDU is determined based on the uplink bandwidth subfield and the uplink bandwidth extension subfield.

* * * * *